US012725109B2

(12) United States Patent
Khan et al.

(10) Patent No.: US 12,725,109 B2
(45) Date of Patent: Sep. 1, 2026

(54) SYSTEM AND METHOD FOR DATA CONNECTOR FOR EXTERNAL LABOR MANAGEMENT SYSTEMS

(71) Applicant: Honeywell International Inc., Charlotte, NC (US)

(72) Inventors: Kalimulla Khan, Bangalore (IN); Srihari Jayathirtha, Happy Valey, AZ (US); Wade Lindsey, Canton, GA (US); Afzal Hussaini Wiquar, Hyderabad (IN); Venkata Pradeep Kolla, Cumming, GA (US); Krishna Pillutla, Marietta, GA (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 188 days.

(21) Appl. No.: 17/936,028

(22) Filed: Sep. 28, 2022

(65) Prior Publication Data

US 2024/0104483 A1 Mar. 28, 2024

(51) Int. Cl.
*G06Q 10/0639* (2023.01)
*G06F 16/25* (2019.01)
(Continued)

(52) U.S. Cl.
CPC ..... *G06Q 10/06398* (2013.01); *G06F 16/258* (2019.01); *G06Q 10/063114* (2013.01); *G06Q 10/0635* (2013.01); *G06V 20/52* (2022.01)

(58) Field of Classification Search
CPC ..... G06Q 10/06398; G06Q 10/063114; G06Q 10/0635; G06Q 10/0639; G06Q 10/06;
(Continued)

(56) References Cited

U.S. PATENT DOCUMENTS 8,311,863 B1 * 11/2012 Kemp ................ G06Q 10/0639 705/7.29
10,062,042 B1 * 8/2018 Kelly ............ G06Q 10/063112
(Continued)

OTHER PUBLICATIONS

GB Office Action, including Search Report Mailed on Feb. 27, 2024 for GB Application No. 2313989, 7 page(s).
(Continued)

*Primary Examiner* — Charles Rones
*Assistant Examiner* — Mohammad S Bhuyan
(74) *Attorney, Agent, or Firm* — ALSTON & BIRD LLP

(57) ABSTRACT

Disclosed are methods and systems for converting data from an external system to data to be used by an internal system. For instance, a method may include receiving at least one user selection from a list of domains for executing at least one task, determining one or more data requirements corresponding to the at least one user selection, in response to determining the one or more data requirements, retrieving data from one or more external systems, converting the retrieved data based on the one or more data requirements, the converting including extracting data from the retrieved data based on the one or more data requirements, validating the extracted data, the validating including determining that the extracted data meets or exceeds a primary data requirement threshold, and outputting the validated extracted data to a data model for use by an internal system to execute the at least one task.

20 Claims, 17 Drawing Sheets

(51) Int. Cl.

| | |
|---|---|
| ***G06Q 10/06*** | (2023.01) |
| ***G06Q 10/063*** | (2023.01) |
| ***G06Q 10/0631*** | (2023.01) |
| ***G06Q 10/0635*** | (2023.01) |
| ***G06Q 10/08*** | (2024.01) |
| ***G06V 20/52*** | (2022.01) |
| ***G08B 21/02*** | (2006.01) |

(58) Field of Classification Search

CPC .... G06Q 10/063; G06Q 10/08; G06F 16/258; G06F 16/254; G06V 20/52; G08B 21/02

See application file for complete search history.

(56) References Cited

U.S. PATENT DOCUMENTS

2004/0133460 A1* 7/2004 Berlin .................... G06Q 40/00 705/35
2004/0181467 A1 9/2004 Raiyani et al.
2005/0267814 A1* 12/2005 Balakrishnan ......... G06Q 30/06 705/26.81
2009/0018890 A1* 1/2009 Werth ............ G06Q 10/063112 705/7.14
2019/0102342 A1* 4/2019 Wang ........................ G06F 7/14
2019/0238574 A1* 8/2019 Iliofotou ................. H04L 63/08
2020/0272915 A1* 8/2020 Tata ........................ G06F 16/35
2020/0341996 A1* 10/2020 Todd ..................... G06F 16/258
2021/0109497 A1* 4/2021 Man ................... G06Q 10/0635
2021/0176601 A1* 6/2021 Alsahlawi ............. H04W 4/021
2021/0295236 A1* 9/2021 Lee .................... G06Q 10/0835

OTHER PUBLICATIONS

CA Office Action, including Search Report Mailed on Nov. 22, 2024 for CA Application No. 3213602, 7 page(s).

* cited by examiner

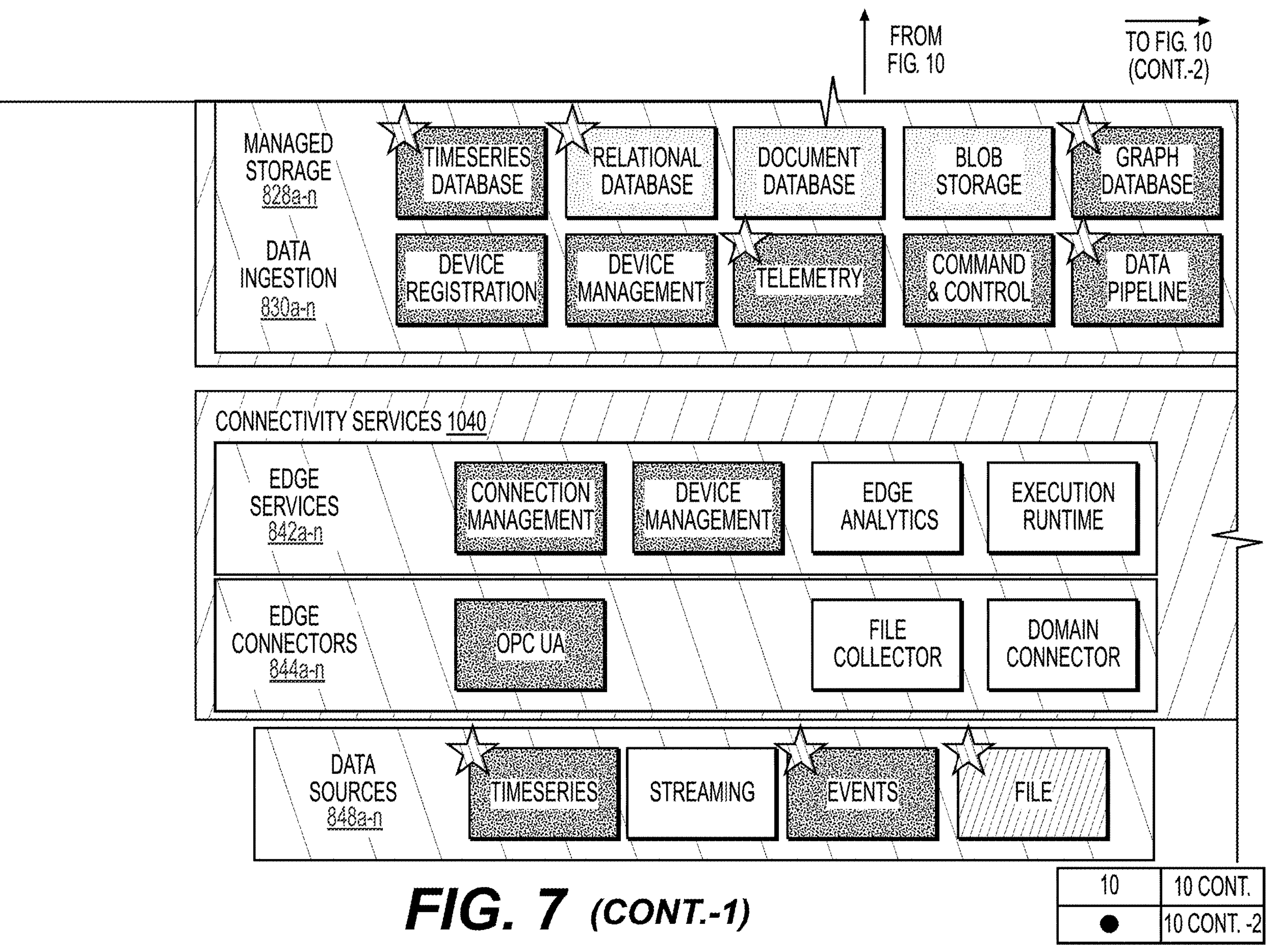
FIG. 7 (CONT.-1)

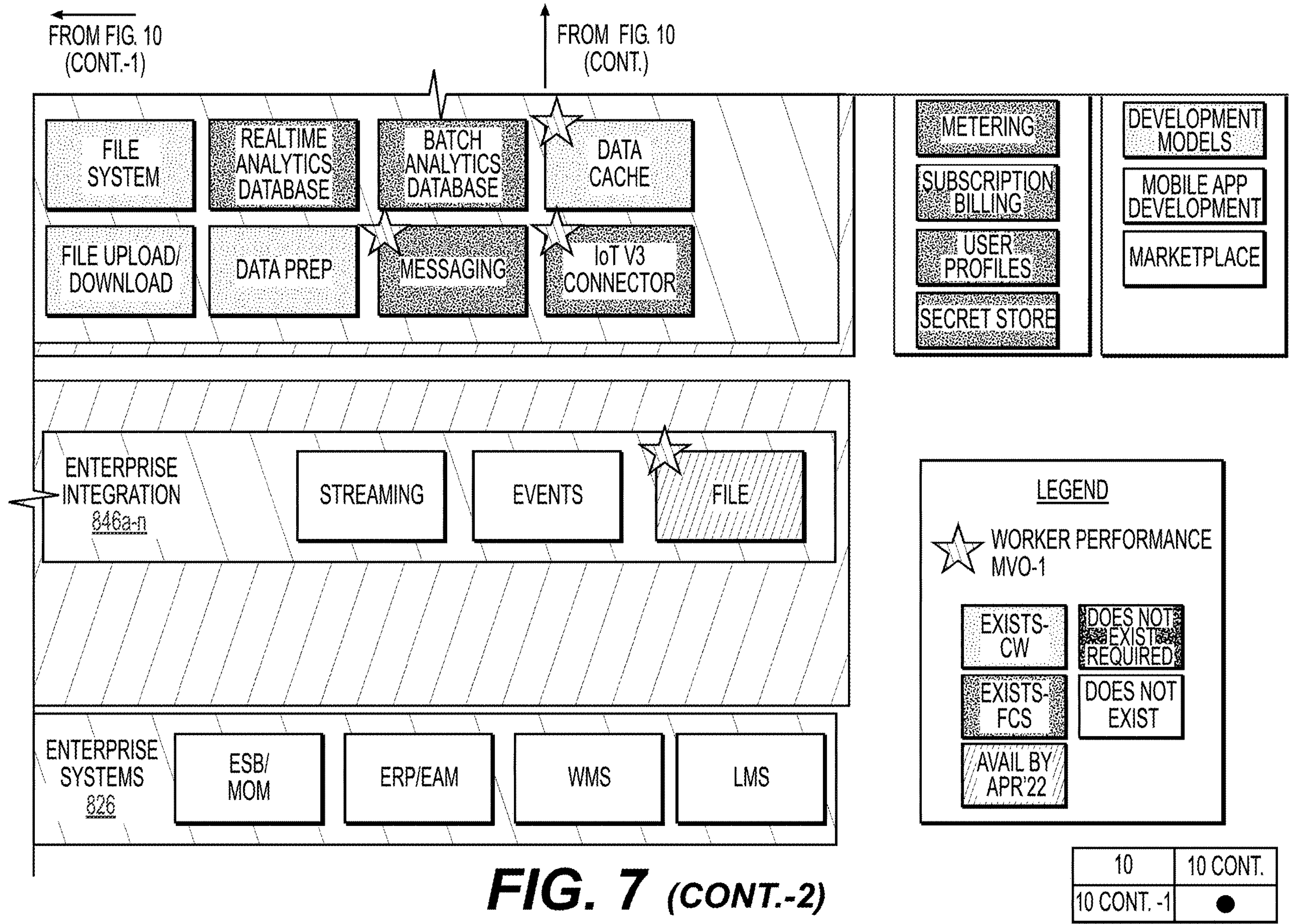
FIG. 7 (CONT.-2)

SYSTEM AND METHOD FOR DATA CONNECTOR FOR EXTERNAL LABOR MANAGEMENT SYSTEMS

TECHNICAL FIELD

Various embodiments of the present disclosure relate generally to methods and systems for converting data from an external labor management system to data to be used by an internal system, in order to optimize operations in a workplace such as a warehouse, distribution center, airport ground operations, and retail generally.

BACKGROUND

Any workplace comes with certain inherent distractions and risks. In order to protect workers, as well as protect the physical, mental, and economic well-being of workers and the workplace, it is advantageous to be able to identify and remediate the potential risk factors in the workplace in real-time. Moreover, external systems may collect data that would be useful for an internal system to preform real-time monitoring. However, conventional techniques lack the ability to utilize external data because such data may be incompatible with an internal system. As a result, the internal system may not be able to provide a complete real-time context for mitigating risk and making decisions. Thus, there exists a need to efficiently convert data from external systems to utilize such data to identify and remediate the potential risk factors in a workplace in real-time.

This disclosure is directed to addressing above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, systems and methods are disclosed for converting data from an external system to data to be used by an internal system.

In one aspect, an exemplary embodiment of a method for converting data from an external system to data to be used by an internal system is disclosed. The method may include receiving, by one or more processors, at least one user selection from a list of domains for executing at least one task. The method may further include determining, by the one or more processors, one or more data requirements corresponding to the at least one user selection. The method may further include, in response to determining the one or more data requirements, retrieving, by the one or more processors, data from one or more external systems, wherein at least one of the one or more external systems includes a user performance external system. The method may further include converting, by the one or more processors, the retrieved data based on the one or more data requirements, the converting including extracting data from the retrieved data based on the one or more data requirements. The method may further include validating, by the one or more processors, the extracted data, the validating including determining that the extracted data meets or exceeds a primary data requirement threshold. The method may further include outputting, by the one or more processors, the validated extracted data to a data model for use by an internal system to execute the at least one task.

In one aspect, a computer system for converting data from an external system to data to be used by an internal system is disclosed. The computer system may include a memory having processor-readable instructions stored therein, and one or more processors configured to access the memory and execute the processor-readable instructions, which when executed by the one or more processors configures the one or more processors to perform a plurality of functions. The functions may include receiving at least one user selection from a list of domains for executing at least one task. The functions may further include determining one or more data requirements corresponding to the at least one user selection. The functions may further include, in response to determining the one or more data requirements, retrieving data from one or more external systems, wherein at least one of the one or more external systems includes a user performance external system. The functions may further include converting the retrieved data based on the one or more data requirements, the converting including extracting data from the retrieved data based on the one or more data requirements. The functions may further include validating the extracted data, the validating including determining that the extracted data meets or exceeds a primary data requirement threshold. The functions may further include outputting the validated extracted data to a data model for use by an internal system to execute the at least one task.

In one aspect, a non-transitory computer-readable medium containing instructions for converting data from an external system to data to be used by an internal system is disclosed. The instructions may include receiving at least one user selection from a list of domains for executing at least one task. The instructions may include determining one or more data requirements corresponding to the at least one user selection. The instructions may include, in response to determining the one or more data requirements, retrieving data from one or more external systems, wherein at least one of the one or more external systems includes a user performance external system. The instructions may include converting the retrieved data based on the one or more data requirements, the converting including extracting data from the retrieved data based on the one or more data requirements. The instructions may include validating the extracted data, the validating including determining that the extracted data meets or exceeds a primary data requirement threshold. The instructions may include outputting the validated extracted data to a data model for use by an internal system to execute the at least one task.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
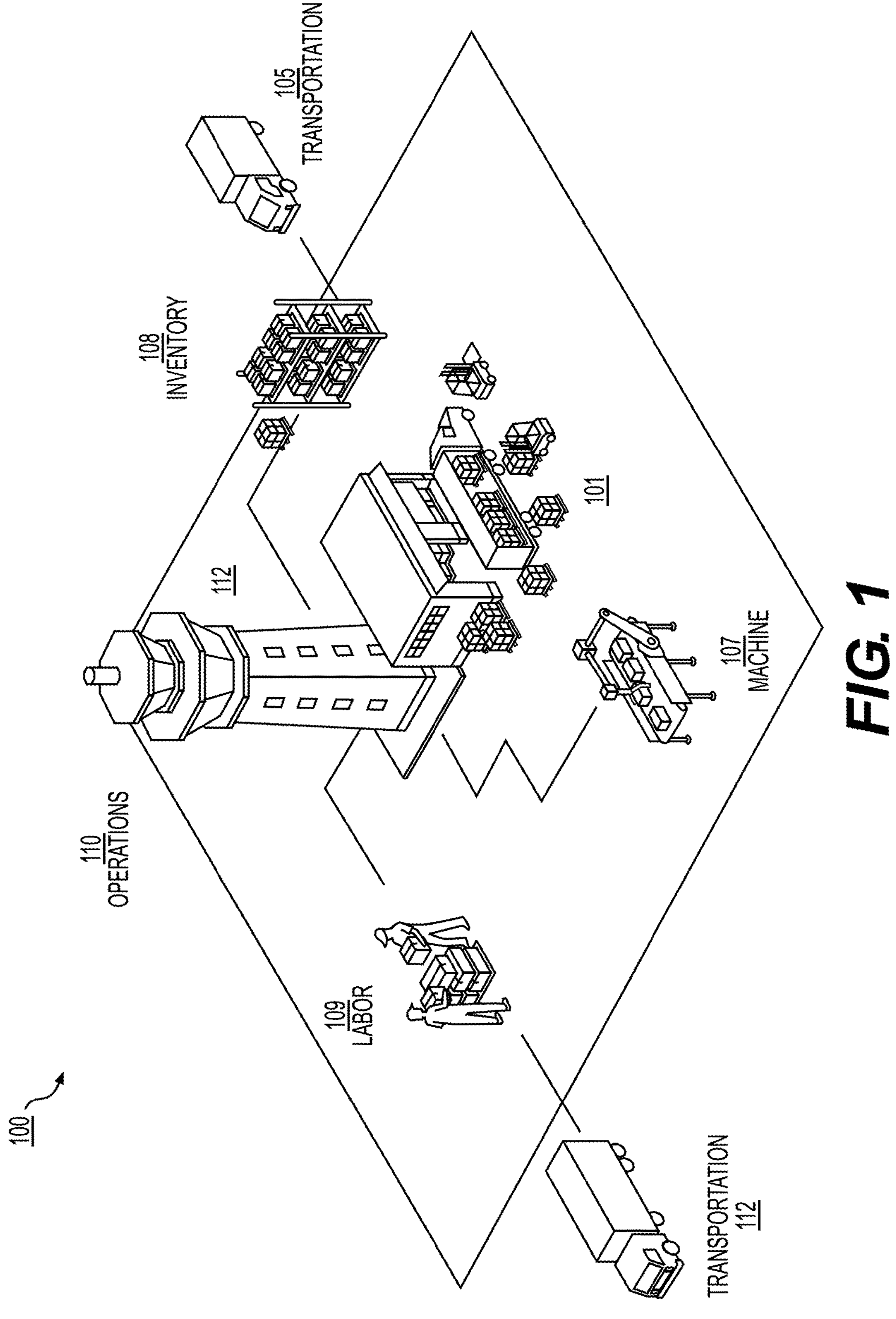
FIG. 1 is a schematic diagram illustrating an example environment implementing methods and systems of this disclosure, according to one or more embodiments.

According to certain aspects of the disclosure, methods and systems are disclosed for converting data from an external labor management system to data to be used by an internal system. Conventional techniques may not be suitable at least because conventional techniques, among other things, do not provide methods for converting data from external labor management systems, such as a Labor Management Service (LMS). Additionally, conventional techniques may not utilize the data from external systems to provide the ability to mitigate risk in a real-time context. Accordingly, improvements in technology relating to converting data from an external labor management system to data to be used by an internal system are desired.

Workplace incidents may have a meaningful impact on the physical, mental, and economic well-being of workers and their families. Additionally, such incidents may also cause various burdens on a company (e.g., medical insurance premiums, lost productivity, and/or the costs of hiring/training replacements). One way of mitigating workplace risk is by performing real-time monitoring and decision-making of a work environment. Important data that may provide a real-time context may be collected by external systems (e.g., LMS). However, the external systems may collect and store the data in a format that may be different from an internal system that provides the real-time monitoring. As a result, there is a demand for converting external system data so that internal systems may be able to use such data for monitoring, managing, and optimizing workplace assets based on a real-time context.

Advantages of such a system may include increasing workplace safety, as well as mitigating and eliminating risk. Additional advantages may include increasing efficiency and productivity of workers by receiving additional data regarding tasks, workers, and the work environment, as well as reducing safety risks. Other advantages may include the ability to translate data from numerous external systems, where each of the external systems may collect and store data in different formats.

The systems and methods disclosed herein relate to converting external system data to data to be used by an internal system. The systems and methods may include receiving, by one or more processors, at least one user selection from a list of domains for executing at least one task. The systems and methods may further include determining, by the one or more processors, one or more data requirements corresponding to the at least one user selection. The systems and methods may further include, in response to determining the one or more data requirements, retrieving, by the one or more processors, data from one or more external systems, wherein at least one of the one or more external systems includes a user performance external system. The systems and methods may further include converting, by the one or more processors, the retrieved data based on the one or more data requirements, the converting including extracting data from the retrieved data based on the one or more data requirements. The systems and methods may further include validating, by the one or more processors, the extracted data, the validating including determining that the extracted data meets or exceeds a primary data requirement threshold. The systems and methods may further include outputting, by the one or more processors, the validated extracted data to a data model for use by an internal system to execute the at least one task.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus. In this disclosure, relative terms, such as, for example, "about," "substantially," "generally," and "approximately" are used to indicate a possible variation of ±10% in a stated value. The term "exemplary" is used in the sense of "example" rather than "ideal." As used herein, the singular forms "a," "an," and "the" include plural reference unless the context dictates otherwise.

Exemplary Environment

FIG. 1 illustrates an exemplary warehouse and/or distribution center environment 100 with certain components, including delivery transportation 105 (e.g., supply chain delivery truck) to load into inventory 108. An operational control tower 112 may monitor and/or otherwise control operations 110 within environment 100. Operations 110 can be performed and/or managed by labor 109. Operations 110 can include loading 101 and assembly machines 107. Once assembled, packaged, and otherwise processed for distribution, transportation 116 (e.g., a freight truck) can be loaded by labor 109 and depart for its subsequent destination. The environment 100 is configured to optimize worker performance by selectively scheduling and assigning tasks and worker equipment, as discussed more particularly below. The terms "worker" and "user" can be understood as a human, a non-human animal (e.g., a trained animal such as a dog) or any other asset that performs tasks at a job site (e.g., a robotic device).

Exemplary Connected Warehouse System Architecture

Figure 2A:
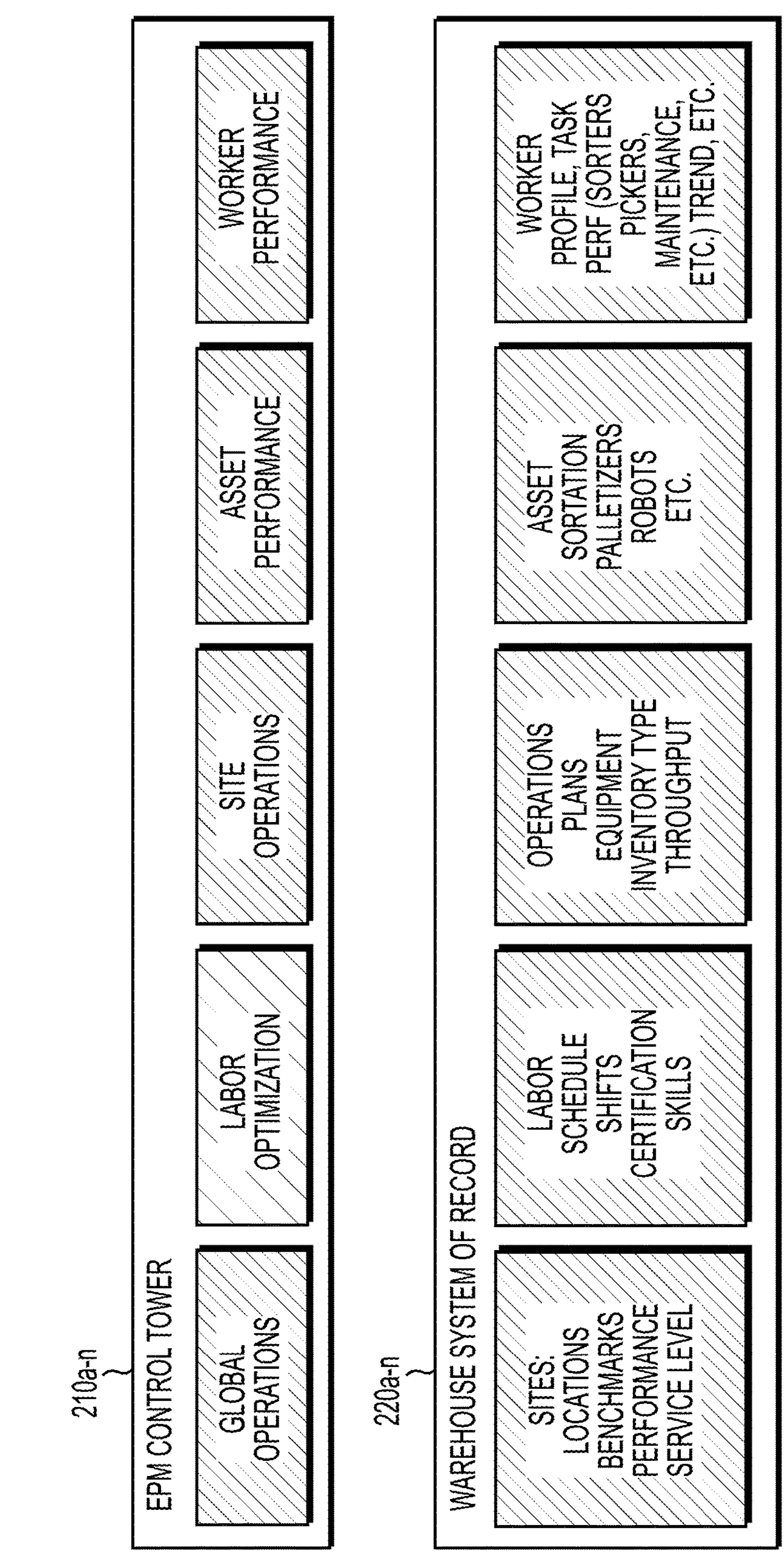
FIG. 2A is a diagram of architecture of a connected warehouse system of this disclosure, according to one or more embodiments.
Figure 2A:
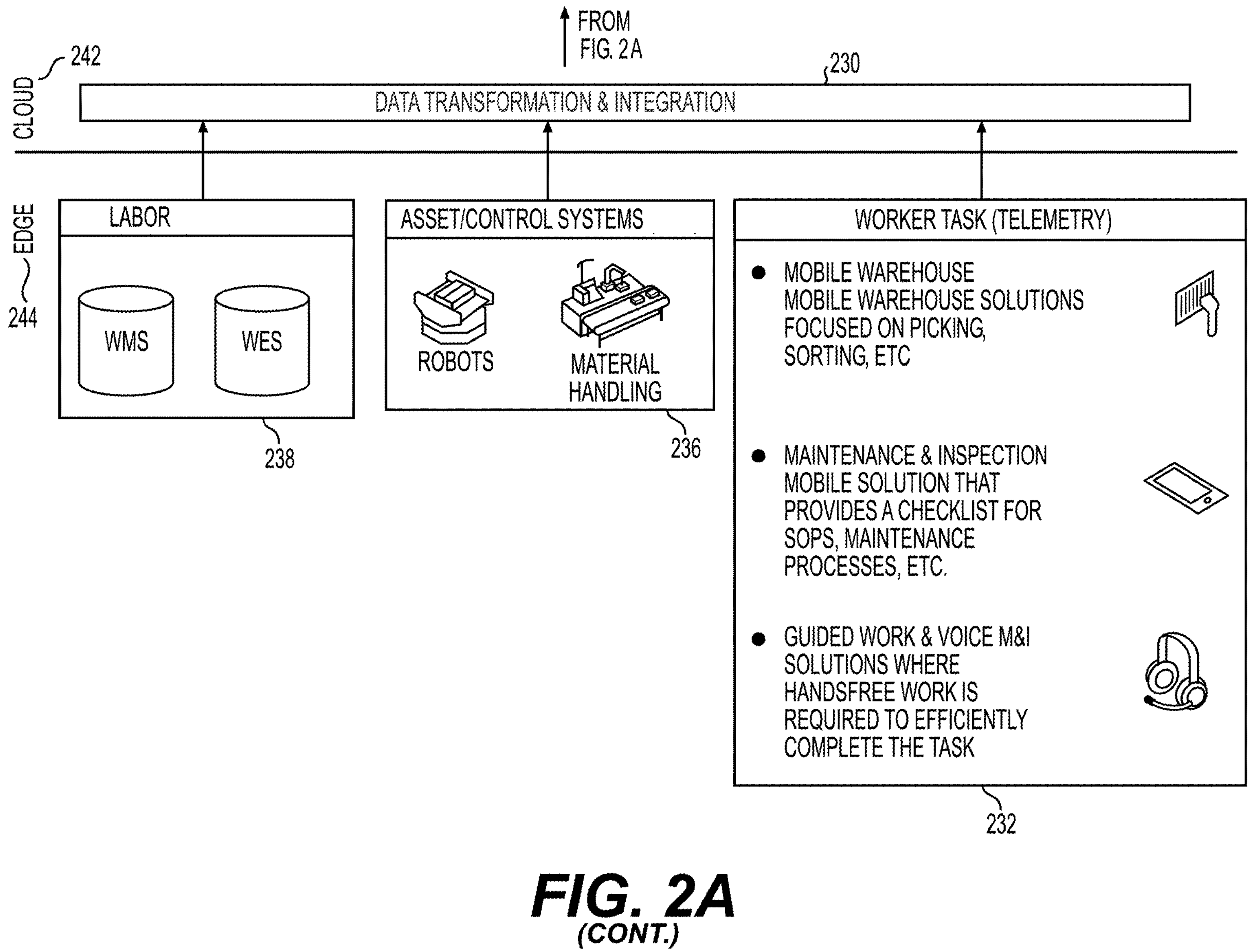

FIG. 2A illustrates a diagram of architecture associated with a connected warehouse system 200 of this disclosure. System 200 may include enterprise performance management (EPM) control tower 210*a-n*, including components and databases such as, but not limited to, global operations, labor optimization, site operations, asset performance, and worker performance. System 200 may also include a networked warehouse system of record 220*a-n*, including components and databases such as, but not limited to, sites (e.g., locations, benchmarks, performance service level, etc.), labor (e.g., schedule, shifts, certification, skills, etc.), operations (e.g., plans, equipment, inventory type, throughput, etc.), assets (e.g., sortation, palletizers, robots, etc.), and/or workers (e.g., trends, profiles, task performance such as sorters, pickers, maintenance works, etc.). EPM control tower 210*a-n* and networked warehouse system of record 220*a-n* can reside in a cloud based computing system 242 (e.g., a cloud computing network, one or more remote servers) and be communicatively coupled to data transformation and integration layer 230.

System 242 may be communicatively coupled to an edge computing system 244. System 244 can be an edge computing system or node with a dedicated unit onsite at the work site (e.g., factory, distribution center, warehouse, etc.). System 244 can be configured to process data and information from labor database 238, asset control systems 236 (e.g., components related to control of robots, material handling, etc.) and worker tasks database 232. Database 238 can include databases for warehouse management services (WMS) and warehouse execution systems (WES).

Database 232 can include one or more telemetry components operatively coupled to features of distribution center environment 100 to process and transmit control information, the incoming control information for consumption by one or more controllers of system 240 over a network. Database 232 can be configured for data validation and modification for incoming telemetry or attributes before saving to the database; copy telemetry or attributes from devices to related assets so the telemetry may be aggregated (e.g., data from multiple subsystems can be aggregated in related assets); create/update/clear alarms based on defined conditions; trigger actions based on edge life-cycle events (e.g., create alerts if device is online/offline); load additional data required for processing (e.g., load threshold value for a device that is defined in a user, device, and/or employee attribute); raise alarms/alerts when complex event occurs and use attributes of other entities inside email template; and/or consider user preferences during event processing. In some aspects, messages transmitted from database 232, such as triggers and/or alerts, can be configured for transmitting information to an end user (e.g., site lead, crew in the control tower, etc.) for optimization purposes. System 200 can also be configured to detect near accidents or other misses to build a trend model for early detection of anomalies before faults or malfunctions occur, thus increasing safety. In some aspects, the trend model can perform statistical analysis of worker trends including assigned tasks, event datasets to derive insights on worker performance considering the nature of work, skillset, criticality, labor intensity, etc. In some aspects, the trend model can classify data on a variety of key performance parameters to generate reports, dashboards, and insights that can be presented to users. In some aspects, the trend model can determine benchmarks based on statistics for type of task, skill set, geographical location, industry, and the like to enable performance-based assessment, incentives, and target setting for worker operations.

Database 232 can include mobile warehouse solutions focused on picking, sorting, and other such tasks. Database 232 can include maintenance and inspection components configured to provide one or more checklists with standard operating procedures (SOPs), maintenance processes, and the like. Database 232 can include guided work, as well as voice maintenance and inspection components where hands-free work may be required by employees to complete a task.

Figure 2B:
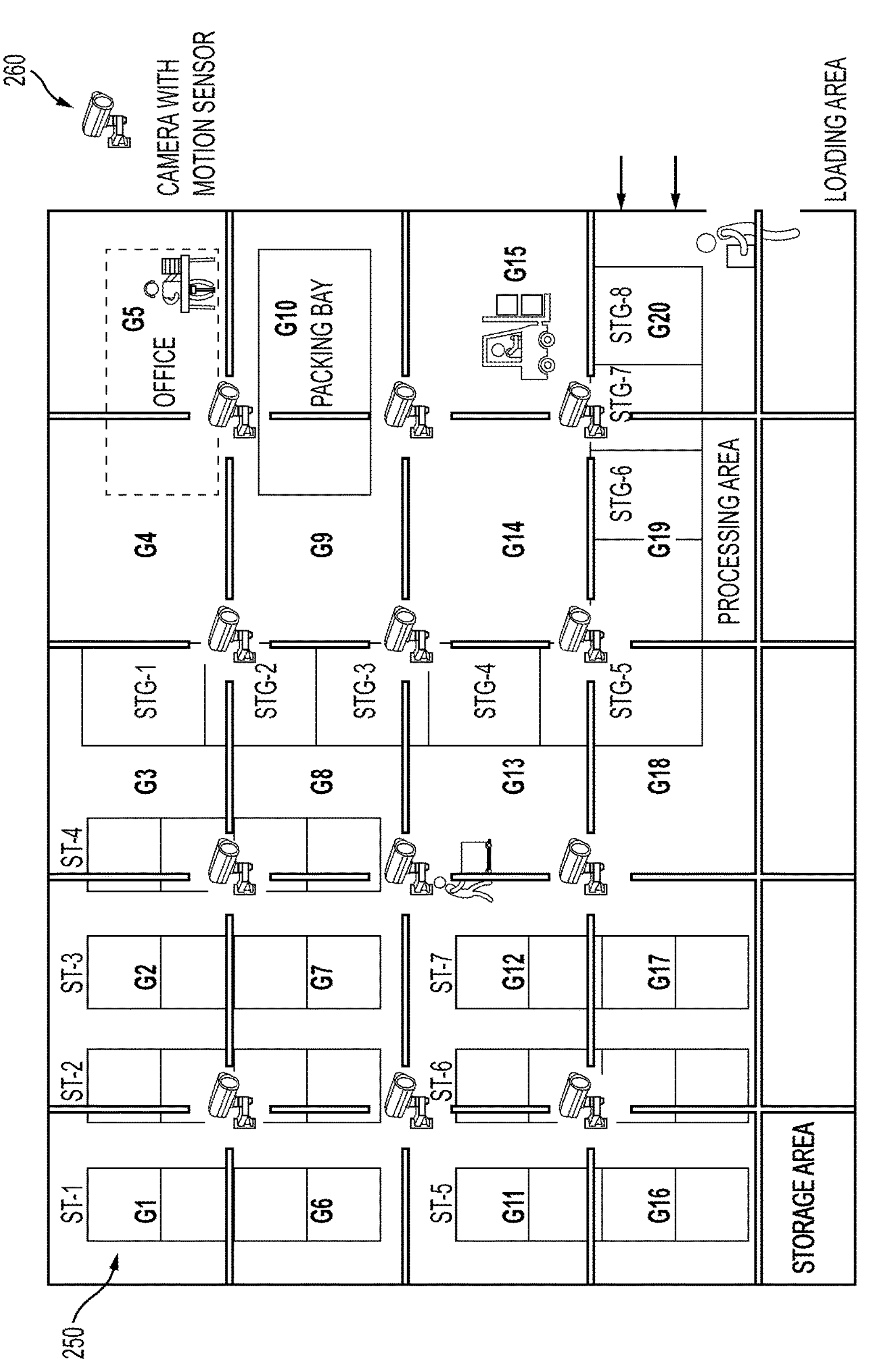
FIG. 2B is a diagram of a layout of a warehouse with the connected warehouse system of this disclosure, according to one or more embodiments.

FIG. 2B is a diagram of a layout of a warehouse with the connected warehouse system described in FIG. 2A. The warehouse may include a job site 250 that may comprise, for example, a storage area, a processing area, a loading area, a packing bay, and/or an office. Workers are generally situated in the storage area, the processing area, the loading area, and/or the packing bay, depending on their assigned tasks. Meanwhile, managers and supervisors may generally be in the office away from at least a majority of the workers. As such, managers and supervisors may have difficulty directly evaluating the engagement of their workers.

The warehouse system 200 described in FIG. 2A may be used to evaluate the engagement of workers against their assigned tasks using a variety of sources including voice input, scanning, device usage, network activity, location-based events, and/or visual recognition events. The input from these sources may be fed to algorithms that identify cases where workers are not fully engaged or not making expected progress against their assignments or tasks.

The system 200 may employ a plurality of methods to track the real-time progress of the tasks. The system may interface with external systems to track the engagement levels of the workers on a real-time basis. This may include tracking specific task scheduled start times, the progress of the task after it has commenced, and/or a completion of the task. The warehouse layout may be equipped with motion sensor cameras 260 at strategic locations to monitor the movement of workers and materials in the warehouse. Each task may be broken down to various stages and each stage associated with desirable time for completion. The time duration of each stage may be based on historic performance of workers, distance, level of effort involved, and company or regulatory practices/policies. The motion sensing cameras may capture the worker and material movement and then automatically compute the status of the task based on the position of the worker and the materials. The worker may also be provided with voice or PED based application that may track and collect information directly from the worker on the progress made.

Since the system 200 also interfaces with external systems for real-time tracking of other events, anomalies, or failures in the business environment, which potentially impact the productivity of the worker, the system 200 may include an algorithm to identify idle and/or unproductive workers. The algorithm may also compare such idle and/or unproductive workers to events that may impact their tasks. If there is no event identified that may explain a worker's idleness, a communication may be triggered to the worker to identify whether there has been a localized or personal incident, such as a medical event or fatigue.

Exemplary System Flow for Optimizing Operations of a Job Site

Figure 3:
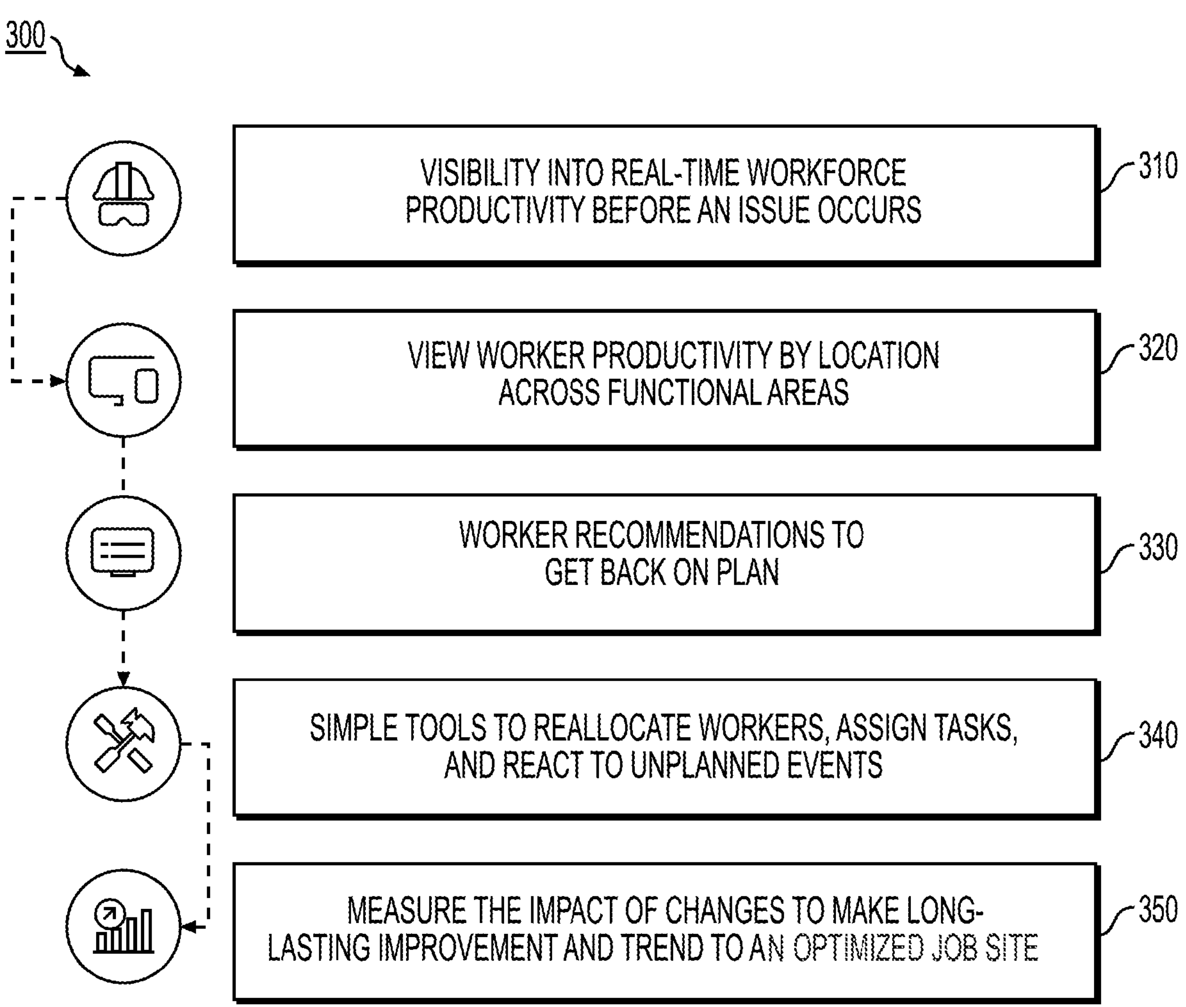
FIG. 3 is a flowchart illustrating a method for optimizing operations of a job site, according to one or more embodiments.

FIG. 3 is a flowchart illustrating a method 300 for optimizing operations of a job site, according to one or more embodiments. In step 310, the method may include providing visibility into real-time workforce productivity before an issue occurs. In step 320, the method may include viewing worker productivity by location across functional areas. In step 330, the method may include providing worker recommendations to return to a worker plan. In step 340, the method may include providing tools to reallocate workers, assignment tasks, and/or react to unplanned events. The reallocation of workers or tasks may be in response to identifying a surplus of idle workers on one task or in one space, and a lack of available workers on another task or in another space. In step 350, the method may include measuring the impact of changes to make persistent improvements and trend to an optimized job site.

Although FIG. 3 shows example blocks of exemplary method 300, in some implementations, the exemplary method 300 may include additional blocks, fewer blocks, different blocks, or differently arranged blocks than those depicted in FIG. 3. Additionally, or alternatively, two or more of the blocks of the exemplary method 300 may be performed in parallel.

Exemplary Processes for Utilizing a Data Connector

Figure 4A:
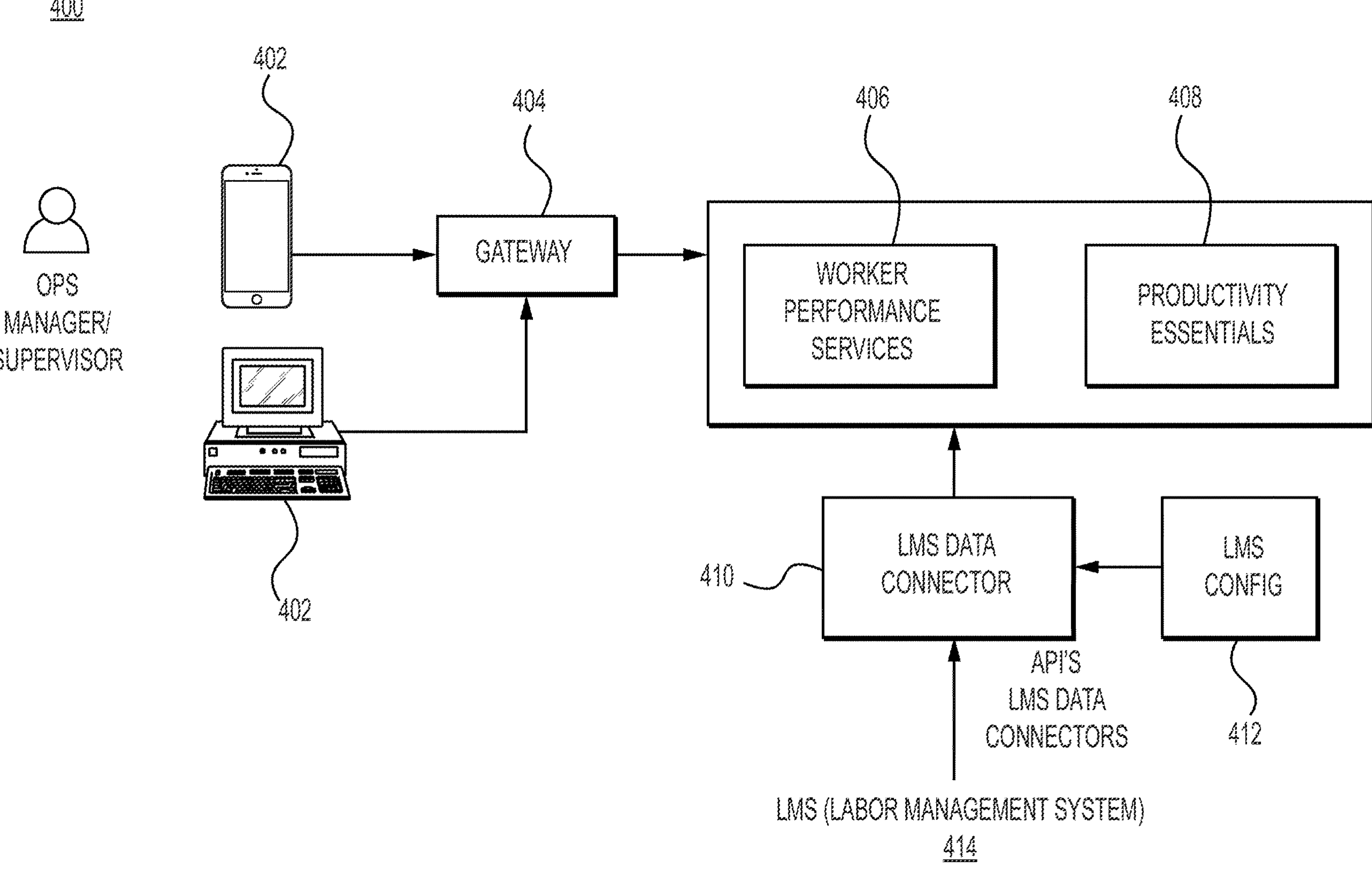
FIG. 4A depicts a process that utilizes a data connector for translating received external data for use by an internal system, according to one or more embodiments.

FIG. 4A illustrates an exemplary process 400 for translating received external data to be used by an internal system, according to one or more embodiments. Notably, process 400 may be performed by one or more processors of a server that is in communication with one or more user devices and other external system(s) via a network. However, it should be noted that process 400 may be performed by any one or more of the server, one or more user devices, or other external systems. Exemplary process 400 may be executed on one or more components of FIGS. 1, 2A, and/or 2B.

The process may include a user communicating with a gateway 404 via one or more devices 402 (e.g., mobile device(s) 402 and/or computing device(s) 402). In some embodiments, devices 402 may be a part of an internal system (e.g., a Labor Management System (LMS)). Devices 402 may provide data to gateway 404 and/or receive data from gateway 404.

The process may further include gateway 404 communicating with worker performance services 406 and/or productivity essentials 408. In some embodiments, the gateway 404 may be a part of an internal system (e.g., LMS). Additionally, the worker performance services 406 and/or productivity essentials 408 may provide real-time data regarding real-time activity in a work environment, as well as assist in executing tasks and/or meet key performance indicators (KPIs) for a period of time (e.g., an hour, a day, a quarter). For example, worker performance services 406 and/or productivity essentials 408 may provide real-time support, data collection, and/or recommendations for various services, such as warehouse services, distribution center services, medical facility services, airport ground operation services, retail services, and the like. In order to provide the most current information, the worker performance services 406 and/or the productivity essentials 408 may utilize LMS data to assist in making sure that the information used by the worker performance services 406 and/or the productivity essentials 408 is the most current.

The process may further include an external system, such as a Labor Management System (LMS) 414 communicating with LMS data connector 410, where the LMS data connector 410 may then communicate with the internal system (e.g., worker performance services 406, productivity essentials 408). The LMS data connector 410 may receive data from the external system 414 and convert the data so that it is in a format that may be used by an internal system. An LMS configuration file 412 may also communicate with LMS data connector 410. For example, LMS configuration file may communicate configuration executable to LMS data connector 410, in order to assist LMS data connector 410 in the translation process.

The LMS data connector 410 may receive data from LMS 414. For example, the LMS data connector 410 may receive the data via one or more APIs from LMS 414. LMS 414 may collect data related to tasks, users, environments, and the like. LMS 414 may then send such data to LMS data connector 410. LMS configuration 412 may communicate one or more configuration executables to LMS data connector 410. For example, the one or more configuration executables may describe the format of the data collected by LMS 414. LMS data connector 410 may then translate the data received from LMS 414 using LMS configuration 412. LMS data connector 410 may also communicate the translated data to the internal system (e.g., worker performance services 406, productivity essentials 408).

The LMS data connector 410 may include a module that acts as an interface to integrate external executables of the external system as internal executables of the internal system. In some embodiments, the LMS data connector 410 may include an engine and/or a database that may assist in translating external system data (e.g., LMS 414 data) into data for use by the internal system (e.g., worker performance services 406, productivity essentials 408).

Although FIG. 4A shows example blocks of exemplary process 400, in some implementations, the exemplary process 400 may include additional blocks, fewer blocks, different blocks, or differently arranged blocks than those depicted in FIG. 4A Additionally, or alternatively, two or more of the blocks of the exemplary process 400 may be performed in parallel.

Figure 4B:
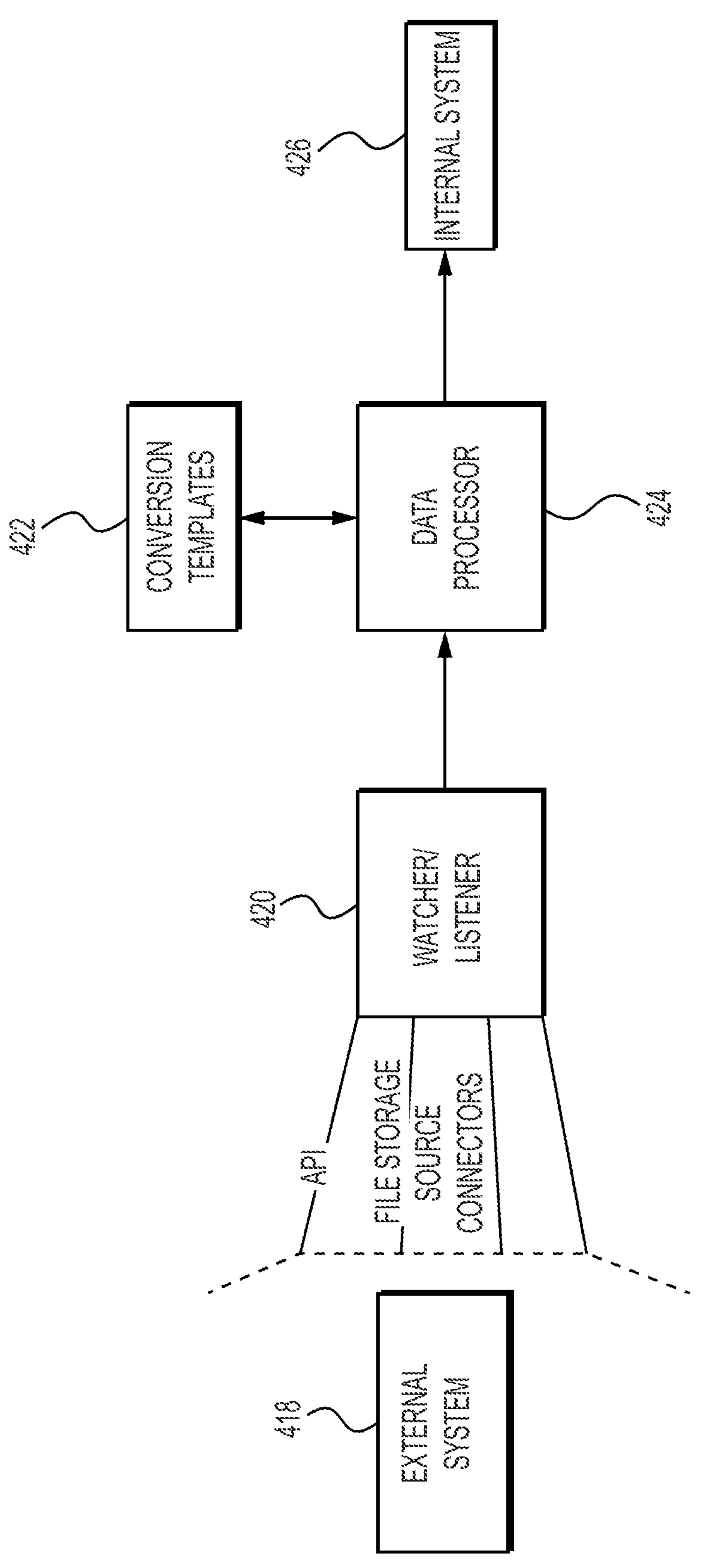
FIG. 4B depicts a process for translating received external data to be used by an internal system, according to one or more embodiments.

FIG. 4B illustrates an exemplary process 416 of a data connector translating received external data to be used by an internal system, according to one or more embodiments. Notably, process 416 may be performed by one or more processors of a server that may be in communication with one or more user devices and other external system(s) via a network. However, it should be noted that process 416 may be performed by any one or more of the server, one or more user devices, or other external systems. Exemplary process 416 may be executed on one or more components of FIGS. 1, 2A, 2B, and/or 4A.

The process may include an external system 418 communicating with a watcher/listener 420. The external system 418 may communicate with the watcher/listener 420 via API calls, file storage, source connectors, and the like. The watcher/listener 420 may receive data from the external system 418.

The watcher/listener 420 may communicate the data, which may have been received from the external system 418, to data processor 424. Data processor 424 may include a generic data formatting engine that may be able to receive different types of data (in different formats) from different external systems. Upon receiving the data, data processor 424 may receive one or more conversion templates from conversion templates 422. The conversion templates may include one or more data models. The data models may include one or more data structures. The data models may be standardized, where the data models may include one or more parameters. Conversion templates 422 may store the one or more data models. In some embodiments, the configuration file (described above) may inform one or more updates that should be made to one or more data models. The data processor 424 may convert the data received from watcher/listener 420 so that the data may be in a format that may be used by the internal system. After converting the data, data processor 424 may update the data model(s) by inserting parts of the converted data as different parameters into the data models.

After the data processor 424 updated the data model(s), the data processor 424 may send the updated data model(s) to internal system 426. Upon receiving the updated data model(s), the internal system 426 may execute the data model(s). For example, executing the data model(s) may allow for the execution of one or more tasks.

Although FIG. 4B shows example blocks of exemplary process 416, in some implementations, the exemplary process 416 may include additional blocks, fewer blocks, different blocks, or differently arranged blocks than those depicted in FIG. 4B Additionally, or alternatively, two or more of the blocks of the exemplary process 416 may be performed in parallel.

Exemplary Method for Converting Data

Figure 5:
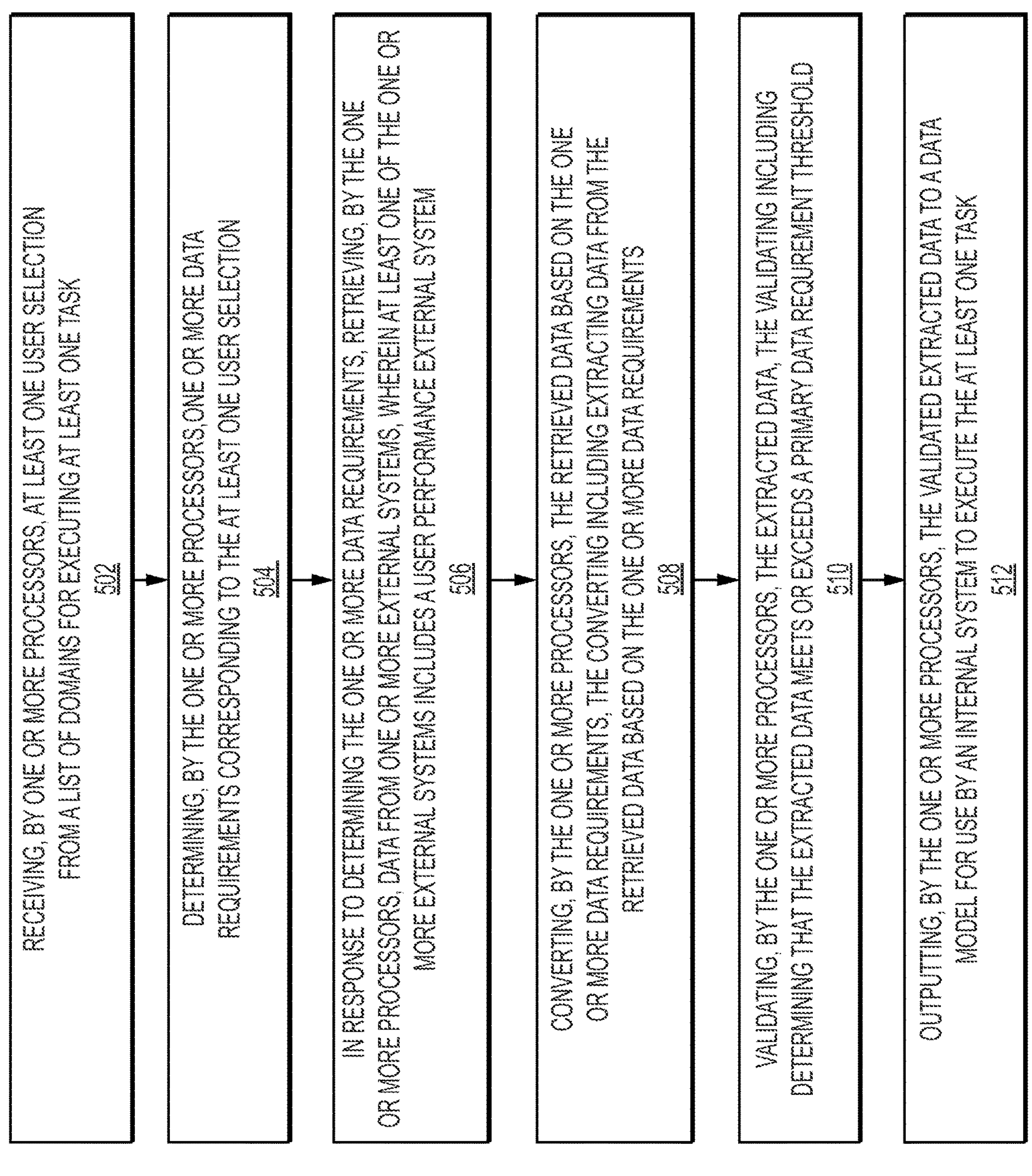
FIG. 5 depicts a flowchart of an exemplary method for converting data from an external system to data to be used by an internal system, according to one or more embodiments.

FIG. 5 illustrates an exemplary method 500 for converting data from an external system to data to be used by an internal system, according to one or more embodiments. Notably, method 500 may be performed by one or more processors of a server that is in communication with one or more user devices and other external system(s) via a network. However, it should be noted that method 500 may be performed by any one or more of the server, one or more user devices, or other external systems. Exemplary method 500 may be executed on one or more components of FIGS. 1, 2A, 2B, 3, 4A, and/or 4B.

The method may include receiving, by one or more processors, at least one user selection from a list of domains for executing at least one task (Step 502). The list of domains may be displayed on one or more user interfaces for the user's selection. In some embodiments, the at least one user selection may be made automatically by a system. In some embodiments the at least one user selection may be made by a preselected option. The list of domains may include at least one of: a task domain, a user domain, a location domain, or an incident domain. The task domain may correspond to data of one or more tasks, where the one or more tasks may correspond to at least one job. The user domain may correspond to one or more users who may complete the one or more tasks. The location domain may correspond to one or more locations of the one or more tasks. The incident domain may correspond to one or more incidents that may have occurred before, during, and/or after a task was completed. The at least one task may correspond to a task for completing a particular job. In some embodiments, the task may correspond to at least one key performance indicator (KPI).

The method may include determining, by the one or more processors, one or more data requirements corresponding to the at least one user selection (Step 504). For example, the one or more data requirements may include different requirements based on the domain that the user selected. The one or more data requirements may include primary data requirements, secondary data requirements, and the like. The primary data requirements may correspond to data that may be needed for the conversion to be successful. The secondary data requirements may correspond to data that may not be needed for the conversion to be successful, but may be useful to have and convert. In some embodiments, the one or more data requirements may correspond to one or more parameters (e.g., task identifier, user identifier, task location(s), task date) of data. One or more databases may store data records corresponding to each of the domains. The data records may include one or more data requirements for a particular domain. The method may include determining the one or more data requirements by retrieving a data record corresponding to the selected domain.

The method may include, in response to determining the one or more data requirements, retrieving, by the one or more processors, data from one or more external systems, wherein at least one of the one or more external systems includes a user performance external system (Step 506). The one or more external systems may correspond to one or more systems that monitor, collect, and/or store data corresponding to task management data, user performance data, user personal data, or location data. For example, at least one of the external systems may include a user performance external system that may monitor, collect, and/or store data corresponding to one or more users who may participate in completing one or more tasks (e.g., Labor Management Service (LMS)). Additionally, the retrieved data may include task management data, user performance data, user personal data, or location data. The retrieved data may be retrieved based on the selected domain. For example, the retrieved data may be a subset of data of the one or more external systems, where the one or more external systems may designate the retrieved data as belonging to a subset of data that may be relevant to the selected domain.

In some embodiments, the method may include preprocessing, by the one or more processors, the retrieved data, the preprocessing including at least one of: decrypting the retrieved data, error handling the retrieved data, normalizing the retrieved data, and the like. The retrieved data may be preprocessed so that the retrieved data may be decrypted. Additionally, any error handling may be performed on the retrieved data. Also, the retrieved data may be normalized. Any other preprocessing may be performed on the retrieved data to standardize the retrieved data and make the retrieved data ready for converting.

The method may include converting, by the one or more processors, the retrieved data based on the one or more data requirements, the converting including extracting data from the retrieved data based on the one or more data requirements (Step 508). The embodiment may include receiving a configuration file from the one or more external systems. The configuration file may describe the format (e.g., the parameters) of the retrieved data. Additionally, the data may be extracted from the retrieved data based on the format described in the configuration file. In some embodiments, a configuration file may not be used to extract data from the retrieved data. The data may be extracted from the retrieved data based on the one or more data requirements. For example, data values corresponding to particular parameters, which may described by the one or more data requirements, may be extracted from the retrieved data. Additionally, the extracted data may be stored in one or more data stores of an internal system. In some embodiments, the retrieved data from each of the external systems may include data that may be in a different format from each other.

The method may include validating, by the one or more processors, the extracted data, the validating including determining that the extracted data meets or exceeds a primary data requirement threshold (Step 510). The validating may determine that the extracted data may be sufficient to proceed to the next step. If the extracted data may not be sufficient, the process may stop until sufficient data has been received. For example, the validating may include determining that enough necessary data ("primary data") has been received by determining whether the extracted data includes enough primary data to meet or exceed a primary data requirement threshold. Additionally, or alternatively, in some embodiments, validating the extracted data may include determining that the extracted data is current by analyzing a time stamp of the retrieved data. If the data is not current, the method may include retrieving and then converting more current data.

In some embodiments, the validating the retrieved data may include translating, by the one or more processors, the one or more data requirements into one or more primary data requirements and one or more secondary data requirements. In some embodiments, the one or more data requirements may include other types of requirements. The method may also include comparing, by the one or more processors, the retrieved data to the one or more primary data requirements. The method may also include, based on the comparing, determining, by the one or more processors, a ratio of the one or more primary data requirements that the retrieved data meets. The determining may include evaluating how many of the one or more primary data requirements are satisfied by the retrieved data. In some embodiments, the ratio may be expressed as a percentage. The method may also include analyzing, by the one or more processors, the ratio to determine whether the ratio meets or surpasses the primary data requirement threshold. For example, the ratio may be compared to the primary data requirement threshold to determine whether the ratio meets or surpasses the primary data requirement threshold. The method may also include, in response to determining that the ratio does not meet or surpass the primary data requirement threshold, outputting, by the one or more processors, a notification to a display or to a database record, the notification indicating that the validating may not be completed. For example, the notification may also indicate that additional data may need to be provided in order for the validating to be completed.

In some embodiments, the validating the retrieved data may include comparing, by the one or more processors, the retrieved data to the one or more secondary data requirements. The method may include, based on the comparing, determining, by the one or more processors, a ratio of the one or more secondary data requirements that the retrieved data meets. The determining may include evaluating how many of the one or more secondary data requirements are satisfied by the retrieved data. In some embodiments, the ratio may be expressed as a percentage. The method may include analyzing, by the one or more processors, the ratio to determine whether the ratio meets or surpasses a secondary data requirement threshold. For example, the ratio may be compared to the secondary data requirement threshold to determine whether the ratio meets or surpasses the secondary data requirement threshold. The method may include, in response to determining that the ratio does not meet or surpass the secondary data requirement threshold, outputting, by the one or more processors, a secondary notification to the display or to the database record, the secondary notification warning that the secondary data requirement threshold was not met.

The method may include outputting, by the one or more processors, the validated extracted data to a data model for use by an internal system to execute the at least one task (Step 512). The data model may correspond to the internal system, where the data model may include parameters, values, and/or formats that may be different than those of the retrieved data. In some embodiments, the data model may correspond to the selected domain, where each domain and/or external system may have a corresponding standardized domain model. Alternatively, in some embodiments, the data model may be the same standardized domain model for all of the domains and/or external systems. The validated extracted data may be output to the data model by inserting one or more parameters of the validated extracted data into one or more parameter placeholders of the data model. In some embodiments, the method may include initiating the data model to execute the at least one task.

In some embodiments, the method may include storing, by the one or more processors, the data model into one or more data stores. The data model may be stored in one or more data records of one or more data stores. Additionally, for example, the one or more data stores may be a part of the internal system.

Although FIG. 5 shows example blocks of exemplary method 500, in some implementations, the exemplary method 500 may include additional blocks, fewer blocks, different blocks, or differently arranged blocks than those depicted in FIG. 5. Additionally, or alternatively, two or more of the blocks of the exemplary method 500 may be performed in parallel.

Exemplary Architecture

Figure 6:
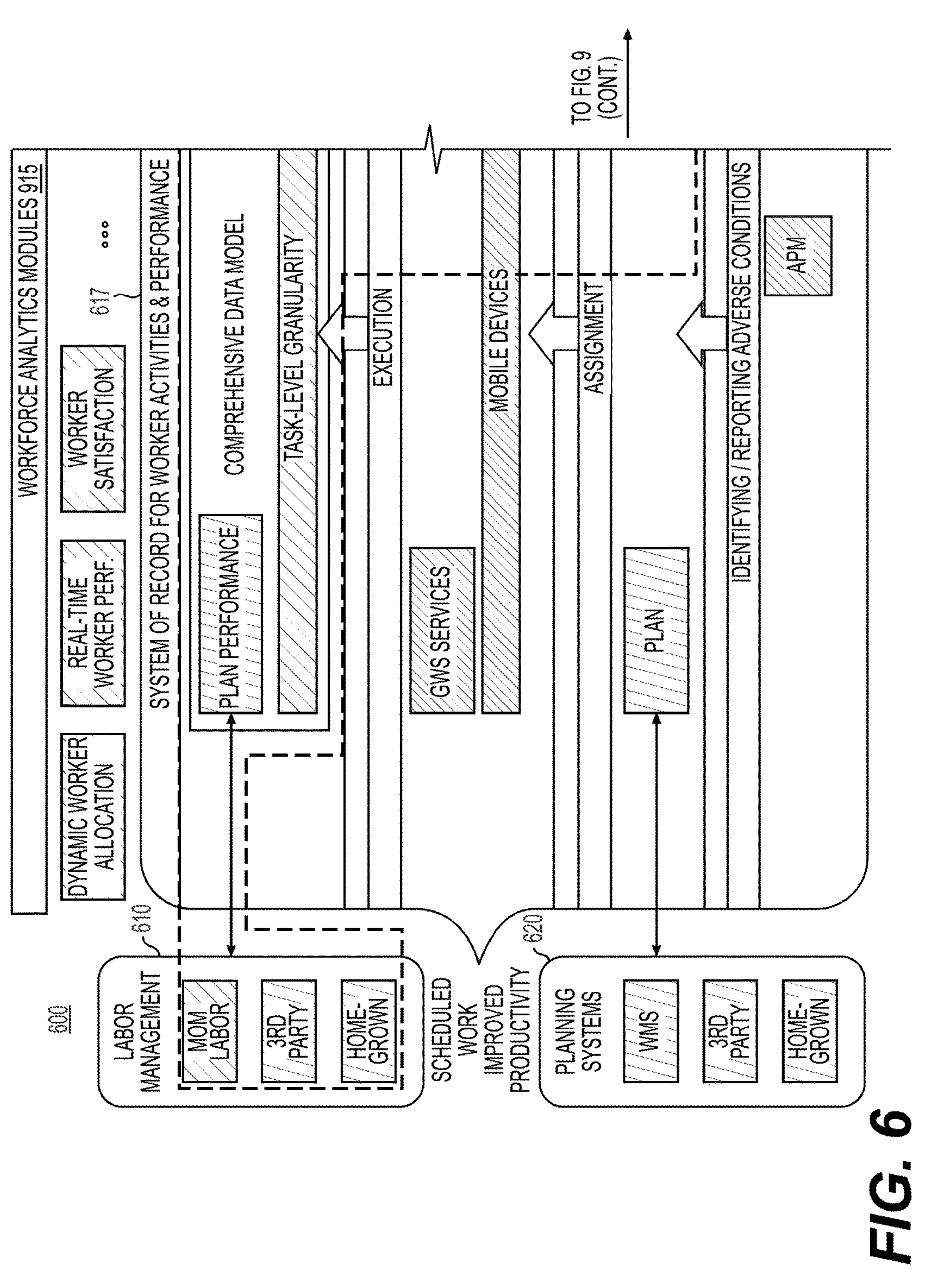
FIG. 6 is a diagram of architecture of a connected warehouse system of this disclosure, according to one or more embodiments
Figure 6:
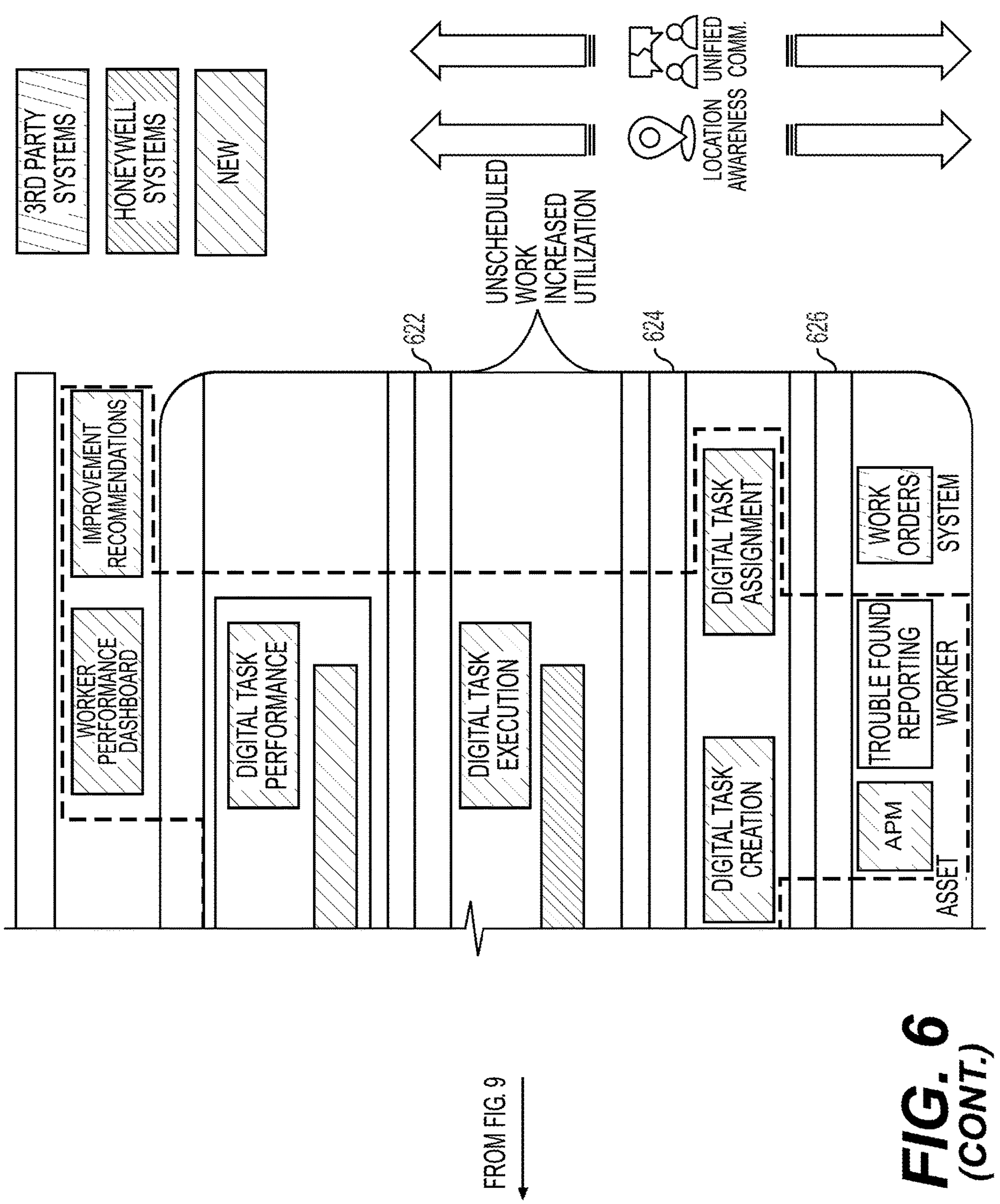

FIG. 6 is a diagram of architecture associated with a connected warehouse system 600, according to one or more embodiments. System 600 may include workforce analytic modules 615, including, but not limited to, modules for dynamic work allocation, real-time worker performance metrics, worker satisfaction, and the like. Workforce analytic modules 615 may also include one or more worker performance dashboards 623 and improvement recommendations 625. Improvement recommendations 625 may be for training, rewarding, coaching, engagement, and the like.

In certain aspects, worker performance dashboards 623 and improvement recommendations 625 may be updated (e.g., in real-time) by a system 617 of record for worker activities and performance. System 617 may be in communication with workforce analytic modules 615. System 617 may improve scheduled worked productivity via labor management module 610 and/or planning systems module 620. Specifically, management module 610 may include one or more discrete components (e.g., components to manage manufacturing operations management (MOM) labor, third party activities, as well as homegrown activities) that in real-time communicate with a comprehensive data model of system 617. The comprehensive data model of system 617 may include a plan performance module bi-directionally coupled to labor management module 610. The comprehensive data model of system 617 may also include modules with digital task performance and task-level granularity. In some aspects, the plan performance module may include a database of worker digital task performance and task-level granularity (e.g., showing discrete subtasks of a task or granular performance metrics of a respective worker task).

In practice, a layer 626 for identifying and reporting adverse conditions may be included in system 617. Layer 626 may include an asset performance manager (APM), as well as systems to manage worker orders. In some aspects, layer 626 may include an operation intel manager and trouble-found reporting system that collectively work to enable layer 626 to communicate with aspects of assignment layer 624 downstream thereof. Layer 626 may include a plan system in bi-directionally coupled to planning systems module 620, including but not limited to warehouse management systems (WMS), third party systems, and the like. The operation intel manager and trouble-found of assignment layer 626 may communicate with digital task creation and digital task assignment systems of assignment layer 624.

Assignment layer 624 may communicate with aspects of execution layer 622 downstream thereof.

Layer 622 may include, or be coupled to, one or more mobile devices (e.g., mobile devices of users and/or personnel associated therewith including employees, managers, and personnel of third parties). Layer 622 may also include guided work software (GWS) systems. In some aspects, the digital task creation and digital task assignment systems of assignment layer 624 may be in communication with the mobile devices of layer 622, as well as a digital task execution system of layer 622. In some examples, mobile devices of layer 622, as well as a digital task execution system of layer 622, may communicate with the task level granularity system, the plan performance system, and/or digital task performance system of the comprehensive data model of system 617 to dynamically update worker performance dashboard 623 and improvement recommendations 625.

Figure 7:
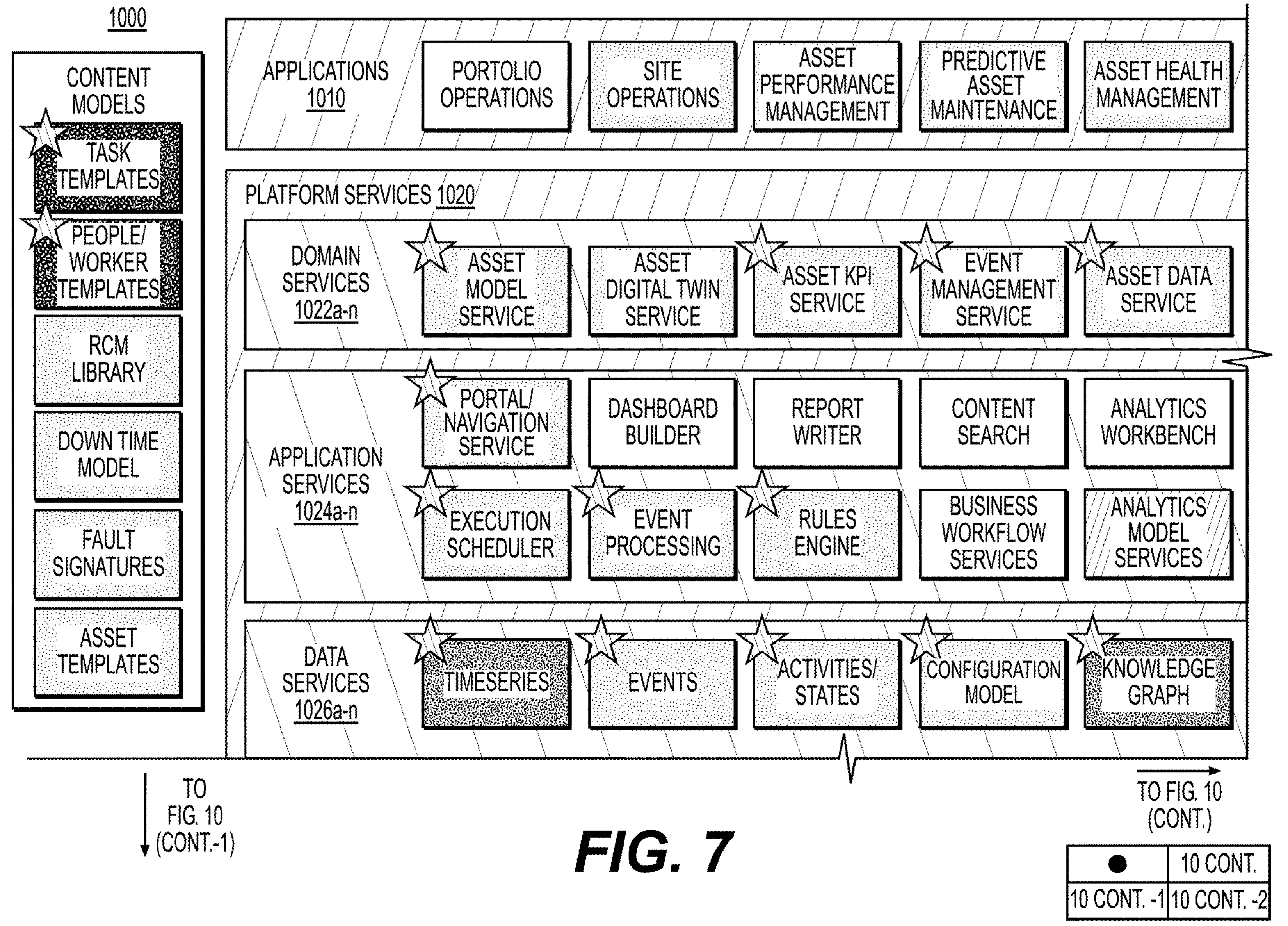
FIG. 7 is a diagram of architecture of a connected warehouse system of this disclosure, according to one or more embodiments.
Figure 7:
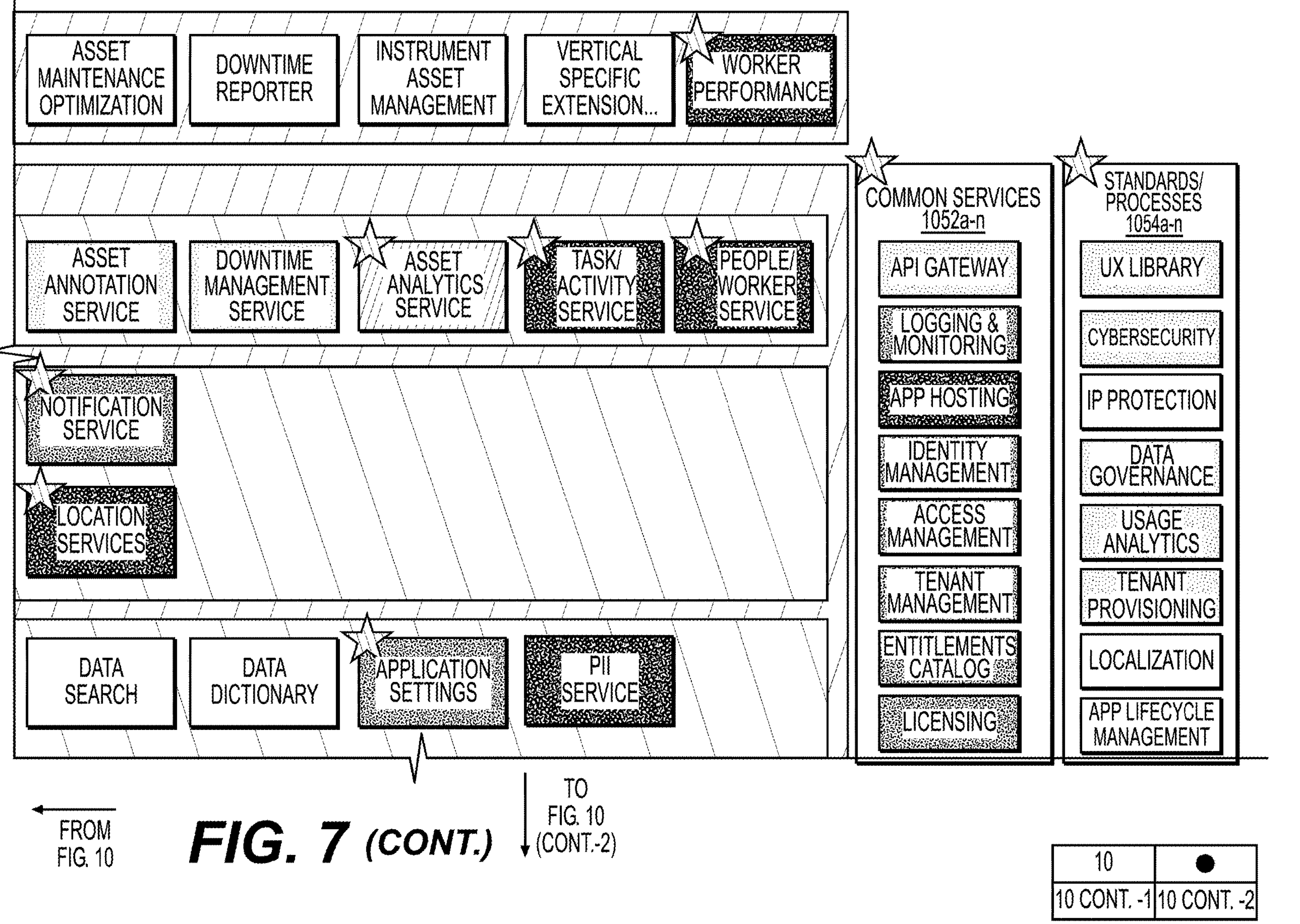

FIG. 7 is a diagram of architecture of a connected warehouse system 700, according to one or more embodiments. System 700 may be a multi-layered system that may include an applications layer 710, a platform services layer 720, a common services layer 752*a-n*, a standards and processes layer 754*a-n*, a connectivity services layer 740, a data sources layer 748*a-n*, and an enterprise systems layer 750*a-n*.

Applications layer 710 can include a plurality of components such as applications for portfolio operations, site operations, asset performance management, predictive asset maintenance, asset health management, asset maintenance optimization, downtime reporter, instrument asset management, vertical specific extension, and worker performance.

Platform services layer 720 can be in communication with applications layer 710 and include a plurality of system components, including domain services 722*a-n*, application services 724*a-n*, data services 726*a-n*, managed storage 728*a-n*, and/or data ingestion 730*a-n*. Domain services 722*a-n* may include modules and/or components for asset model service, asset digital service, asset key performance indicator (KPI) service, event management service, asset data service, asset annotation service, downtime management service, asset analytics service, task/activity service, and/or people worker service. Preferably, domain services 722*a-n* may include asset analytics service systems, task/activity service systems, and/or people worker service systems.

Application services 724*a-n* may include modules and/or components for portal navigation service, dashboard builder, report writer, content search, analytics workbench, notification service, execution scheduler, event processing, rules engine, business workflow services, analytics model services, and/or location services. Some or all of the components of application services 724*a-n* may be in communication with the applications of layer 710.

Data services 726*a-n* may include modules and/or components for time series, events, activities and states, configuration model, knowledge graph, data search, data dictionary, application settings, and/or personal identifying information (PII) services. Managed storage services 728*a-n* may include databases for time series, relational, document, blob storage, graph databases, file systems, real-time analytics databases, batch analytics databases, and/or data caches. Managed storage services 730*a-n* may include modules and/or components for device registration, device management, telemetry, command and control, data pipeline, file upload/download, data prep, messaging, and/or IoT V3 connection.

Connectivity services layer 740 may include edge services 742*a-n*, edge connectors 744*a-n*, and/or enterprise integration 746*a-n*. Edge services 742*a-n* may include modules and/or components for connection management, device management, edge analytics, and/or execution runtime. Edge connectors 744*a-n* may include OPC unified architecture (OPC UA), file collectors, and/or domain connectors. Enterprise integration 746*a-n* may include modules and/or components for streaming, events, and/or files. Data sources layer 748*a-n* may include modules and/or components for streaming, events, and/or files, as well as time series.

In some embodiments, common services 752*a-n* may include one or more API gateways, as well as components for logging and monitoring, application hosting, identify management, access management, tenant management, entitlements catalogues, licensing, metering, subscription billing, user profiles, and/or secret store.

In some embodiments, standards and processes 754*a-n* may include one or more UX libraries, as well as components for cybersecurity, IP protection, data governance, usage analytics, tenant provisioning, localization, app lifecycle management, deployment models, mobile app development, and/or marketplace.

Figure 8:
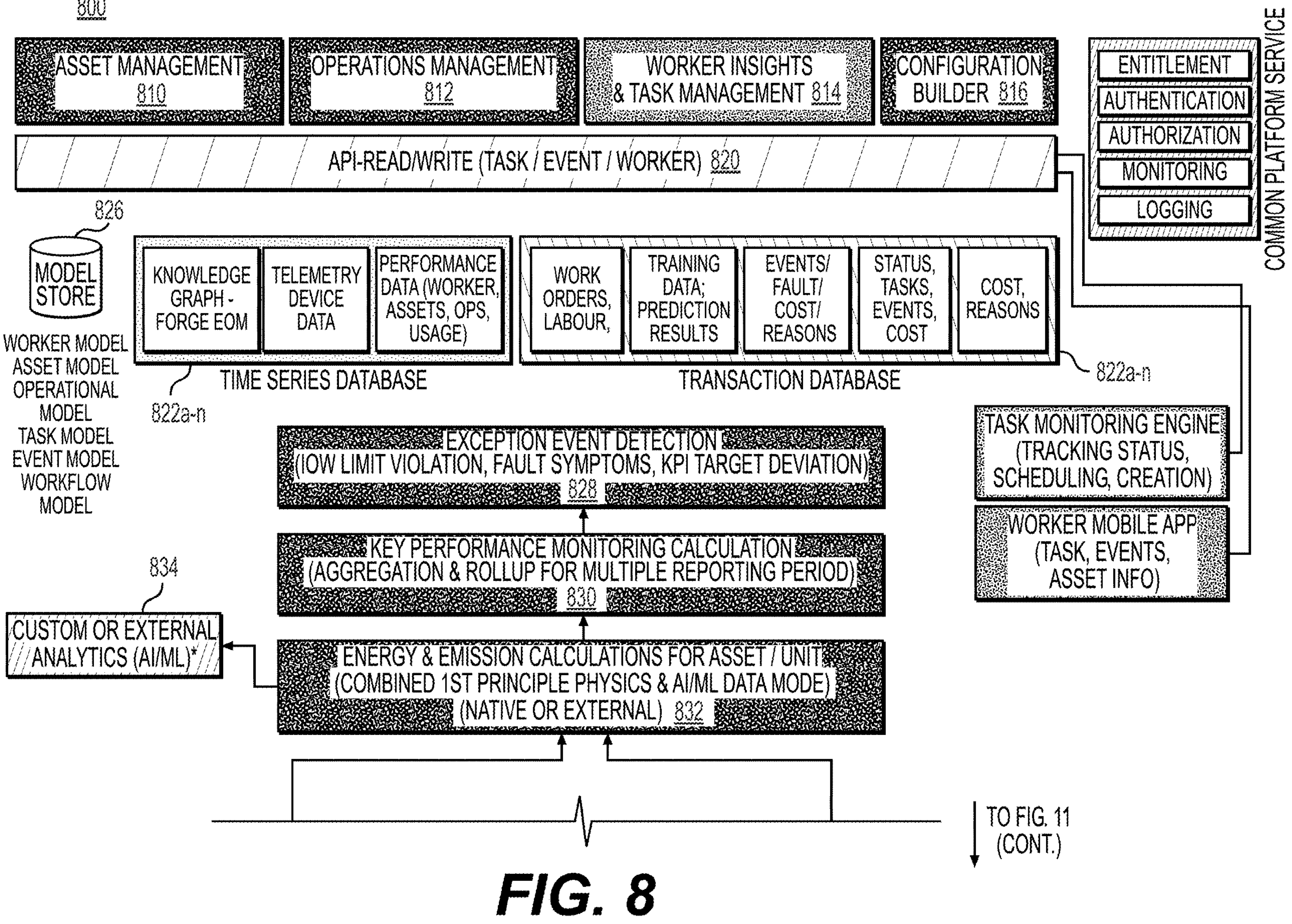
FIG. 8 depicts a schematic block diagram of a framework of a platform of a connected warehouse system, according to one or more embodiments.
Figure 8:
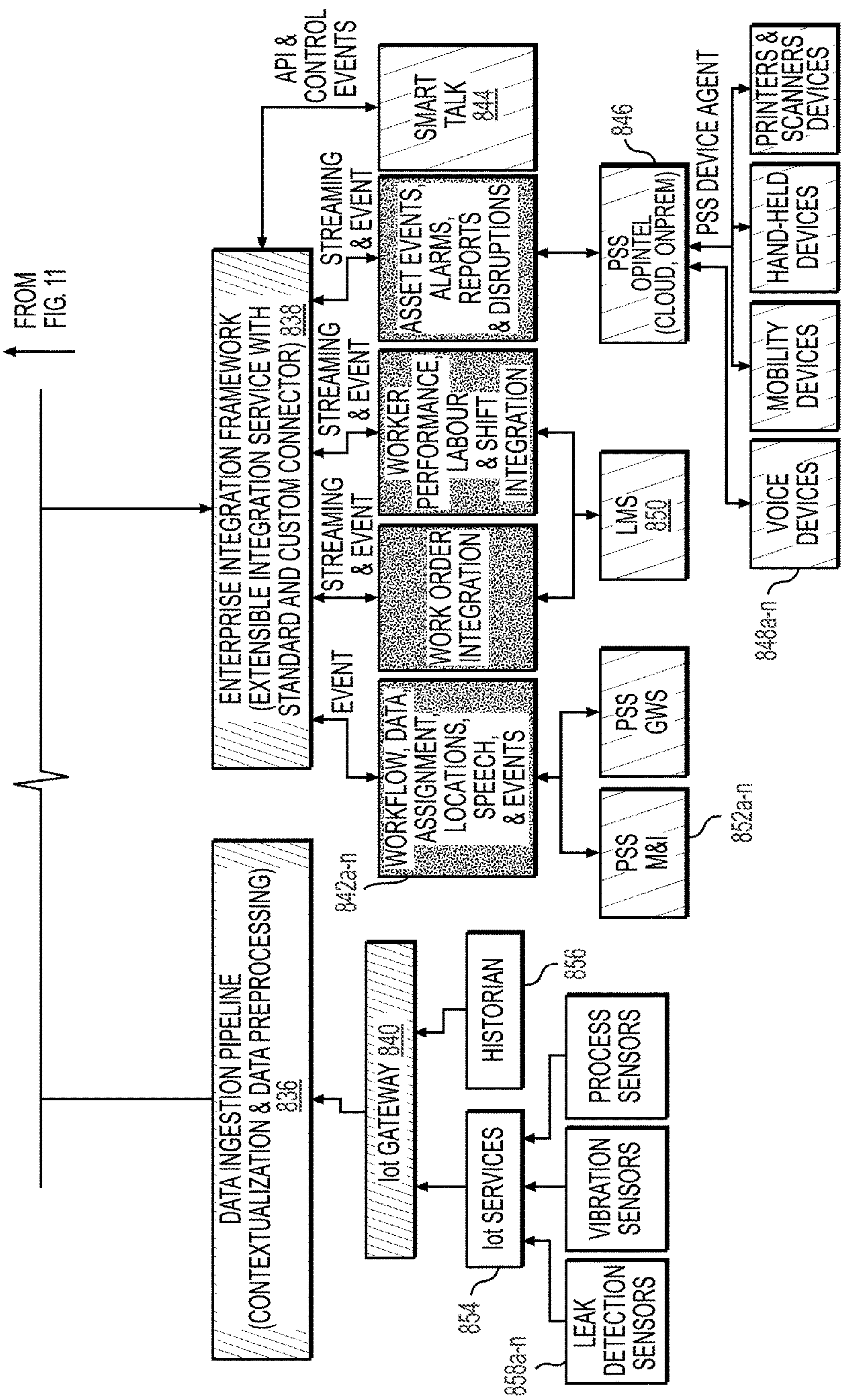

FIG. 8 depicts a schematic block diagram of a framework of a platform of a connected warehouse system 800, according to one or more embodiments. System 800 may include an asset management system 810, operations management system 812, worker insights and task management system 814, and/or configuration builder system 816. Each of systems 810, 812, 814, and 816 may be in communication with API 820, whereby API 820 may be configured to read/write tasks, events, and/or otherwise coordinate working with workers of system 800. API 820 may include a task monitoring engine configured to track status, schedule, and/or facilitate task creation. API 820 may present or otherwise be accessed via a worker mobile application (e.g., a graphical user interview on a computing device) to similarly present and manage operations related to tasks, events, and asset information.

API 820 may be communication with model store 826, whereby model store 826 may include models such as worker models, asset models, operational models, task models, event models, workflow models, and the like. API 820 may be in communication with time series databases 824*a-n* and/or transaction databases 822*a-n*. Time series databases 824*a-n* may include knowledge databases, graph databases, as well as extensible object models (EOMs). Transaction databases 822*a-n* may include components and/or modules for work orders, labor, training data, prediction results, events, fault, costs, reasons, status, tasks, events, and/or reasons.

Each of databases 824*a-n*, 822*a-n* may be in communication with analytics model 834, which may be a machine learning model that effectively processes, analyzes, and classifies operations of system 800. Model 834 may be a trained machine learning system having been trained using a learned set of parameters to predict one or more learned performance parameters of system 800. Learned parameters may include, but are not limited to, predictive asset maintenance of a connected warehouse, asset health management, asset maintenance optimization, worker downtime reporter, instrument asset management, vertical specific extension, and/or worker performance. One or more corrective actions may be taken in response to predictions rendered by model 834. Model 834 may be trained with a regression loss (e.g., mean squared error loss, Huber loss, etc.) and for binary index values it may be trained with a classification loss (e.g., hinge, log loss, etc.). Machine learning systems that may be trained include, but are not limited to, a convolutional neural network (CNN) trained directly with the appropriate loss function, CNN with layers with the appropriate loss function, capsule network with the appropriate loss function, transformer network with the appropriate loss function, multiple instance learning with a CNN (for a binary resistance index value), multiple instance regression with a CNN (for a continuous resistance index value), and the like.

In certain aspects, databases 824*a-n* and 822*a-n* may operate together to perform exception event detection 828. Exception event detection 828 may utilize data from one or more data sources to detect low limit violations, fault symptoms, KPI target deviations, and the like. In certain aspects of exception event detection 828, a data ingestion pipeline 836 and enterprise integration framework 838 may exchange information for energy and emission calculations per asset/units of system 800. Pipeline 836 may utilize contextual data and data preprocessing, while framework 838 may include extensible integration service with standard and customer connectors.

In certain embodiments, an IoT gateway 840 may be communicatively coupled to pipeline 836. IoT gateway 840 can be communicatively coupled to IoT devices 854 such as sensors 858*a-n*, including leak detection sensors, vibration sensors, process sensors, and/or the like. IoT gateway 840 may also be in communication with data historian 856 that includes historical data related to the warehouse.

Framework 838 may be in communication with event manager modules 842*a-n*, including workflow module, work order integration module, worker performance module, asset event module, and the like. For events, the workflow module may be configured to bidirectionally communicate with framework 838 and/or components of process workflow data 852*a-n*, including Process Safety Suite (PSS) maintenance and inspection (M&I) and PSS GWS. For event streaming, work order integration module and worker performance module may both be configured to bidirectionally communicate with framework 838 and labor management systems (LMS) 850. In some embodiments, the event streaming asset event module may also be configured to bidirectionally communicate with PSS operational intelligence systems 846 and framework 838. PSS operational intelligence systems 846 in turn may be cloud-based and/or on premises and bidirectionally communicate with devices 848*a-n*, including voice devices, mobility devices, handheld devices, printers, scanners, and/or the like. Framework 838 can also be in communication with start talk module 844 for corresponding API and event control.

In embodiments of system 800, pipeline 836 and framework 838 may work together to perform step 832 to calculate energy and emission calculations for assets and/or associated units. Model 834 may be used in performing step 832 as well as other native and/or external models connected therewith, whereby step 832 may utilize data received from pipeline 836 and framework 838.

Upon completing step 832, key performance monitoring calculations may be performed in step 830. Step 830 may be performed based on energy and emission calculations from step 832 by aggregating and rolling up across one or multiple reporting periods. Upon performing step 830, the aforementioned event exception detection step 828 may be performed to detect exception events. In some aspects, step 828 may be performed based on the key performance monitoring calculations of step 830.

Exemplary Device

Figure 9:
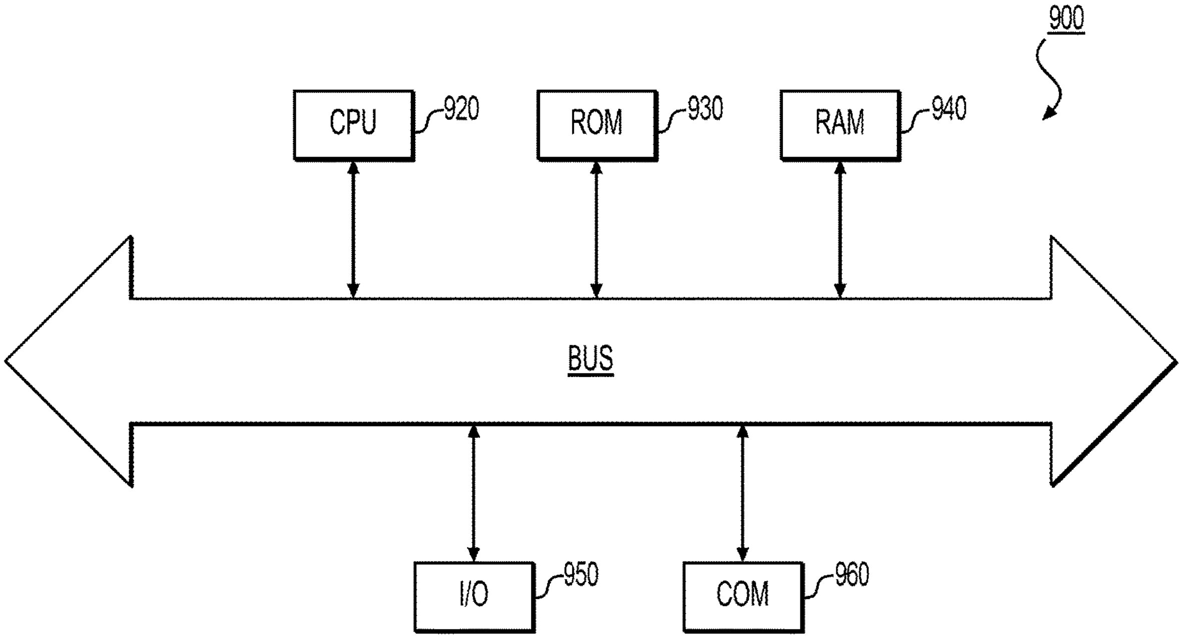
FIG. 9 depicts an example system that may execute techniques presented herein.

FIG. 9 is a simplified functional block diagram of a computer 900 that may be configured as a device for executing the methods of FIGS. 4-5, according to exemplary embodiments of the present disclosure. For example, device 900 may include a central processing unit (CPU) 920. CPU 920 may be any type of processor device including, for example, any type of special purpose or a general-purpose microprocessor device. As will be appreciated by persons skilled in the relevant art, CPU 920 also may be a single processor in a multi-core/multiprocessor system, such system operating alone, or in a cluster of computing devices operating in a cluster or server farm. CPU 920 may be connected to a data communication infrastructure 910, for example, a bus, message queue, network, or multi-core message-passing scheme.

Device 900 also may include a main memory 940, for example, random access memory (RAM), and also may include a secondary memory 930. Secondary memory 930, e.g., a read-only memory (ROM), may be, for example, a hard disk drive or a removable storage drive. Such a removable storage drive may comprise, for example, a floppy disk drive, a magnetic tape drive, an optical disk drive, a flash memory, or the like. The removable storage drive in this example reads from and/or writes to a removable storage unit in a well-known manner. The removable storage unit may comprise a floppy disk, magnetic tape, optical disk, etc., which is read by and written to by the removable storage drive. As will be appreciated by persons skilled in the relevant art, such a removable storage unit generally includes a computer usable storage medium having stored therein computer software and/or data.

In alternative implementations, secondary memory 930 may include other similar means for allowing computer programs or other instructions to be loaded into device 900. Examples of such means may include a program cartridge and cartridge interface (such as that found in video game devices), a removable memory chip (such as an EPROM, or PROM) and associated socket, and other removable storage units and interfaces, which allow software and data to be transferred from a removable storage unit to device 900.

Device 900 also may include a communications interface ("COM") 960. Communications interface 960 allows software and data to be transferred between device 900 and external devices. Communications interface 960 may include a modem, a network interface (such as an Ethernet card), a communications port, a PCMCIA slot and card, or the like. Software and data transferred via communications interface 960 may be in the form of signals, which may be electronic, electromagnetic, optical, or other signals capable of being received by communications interface 960. These signals may be provided to communications interface 960 via a communications path of device 900, which may be implemented using, for example, wire or cable, fiber optics, a phone line, a cellular phone link, an RF link or other communications channels.

The hardware elements, operating systems and programming languages of such equipment are conventional in nature, and it is presumed that those skilled in the art are adequately familiar therewith. Device 900 also may include input and output ports 950 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

Reference to any particular activity is provided in this disclosure only for convenience and not intended to limit the disclosure. A person of ordinary skill in the art would recognize that the concepts underlying the disclosed devices and methods may be utilized in any suitable activity. The disclosure may be understood with reference to the following description and the appended drawings, wherein like elements are referred to with the same reference numerals.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations are possible within the scope of the disclosure. Accordingly, the disclosure is not to be restricted except in light of the attached claims and their equivalents.

What is claimed is:

1. A computer-implemented method for converting data from an external system to data to be used by an internal system, the method comprising:

receiving, by one or more processors, at least one user selection from a list of domains for executing at least one task;

determining, by the one or more processors, one or more data requirements corresponding to the at least one user selection;

in response to determining the one or more data requirements, retrieving, by the one or more processors, data from one or more external systems, wherein at least one of the one or more external systems includes a user performance external system, wherein the user performance external system is configured to capture user performance data indicative of one or more tasks performed by a worker associated with the user performance external system;

converting, by the one or more processors, the retrieved data based on the one or more data requirements, the converting including extracting data from the retrieved data based on the one or more data requirements, wherein the retrieved data comprises the user performance data;

validating, by the one or more processors, the extracted data, the validating comprising:

comparing, by the one or more processors, the extracted data to the one or more data requirements;

based on the comparing, determining, by the one or more processors, that the extracted data comprises an insufficient amount of data to be validated; and in response to determining that the extracted data comprises an insufficient amount of data to be validated, terminating, by the one or more processors, the validation of the extracted data;

retrieving, by the one or more processors, additional data from the one or more external systems in response to the terminating of the validating of the extracted data;

validating, by the one or more processors, combined data, wherein the combined data comprises the extracted data and the additional data;

outputting, by the one or more processors, the validated combined data to a data model for use by an internal system to execute the at least one task;

detecting in real-time, by the one or more processors, an idle worker based at least on task progress data in the combined data, wherein the task progress data comprises visual recognition event data associated with progress of the at least one task; and performing reassignment of a different task to the worker based on task requirements and worker availability.

2. The computer-implemented method of claim 1, wherein the list of domains includes at least one of: a task domain, a user domain, a location domain, or an incident domain.

3. The computer-implemented method of claim 1, the method further comprising:

preprocessing, by the one or more processors, the retrieved data, the preprocessing including at least one of: decrypting the retrieved data, error handling the retrieved data, or normalizing the retrieved data.

4. The computer-implemented method of claim 1, wherein validating the extracted data includes determining that the extracted data is current by analyzing a time stamp of the extracted data.

5. The computer-implemented method of claim 1, wherein the retrieved data includes task management data, user personal data, or location data.

6. The computer-implemented method of claim 1, wherein the validating the combined data includes:

translating, by the one or more processors, the one or more data requirements into one or more primary data requirements and one or more secondary data requirements;

comparing, by the one or more processors, the combined data to the one or more primary data requirements;

based on the comparing, determining, by the one or more processors, a ratio of the one or more primary data requirements that the combined data meets;

analyzing, by the one or more processors, the ratio to determine whether the ratio meets or surpasses a primary data requirement threshold; and in an instance in which the ratio does not meet or surpass the primary data requirement threshold, outputting, by the one or more processors, a notification to a display or to a database record, the notification indicating that the validating may not be completed.

7. The computer-implemented method of claim 6, the method further comprising:

comparing, by the one or more processors, the combined data to the one or more secondary data requirements;

based on the comparing, determining, by the one or more processors, a ratio of the one or more secondary data requirements that the combined data meets;

analyzing, by the one or more processors, the ratio to determine whether the ratio meets or surpasses a secondary data requirement threshold; and in an instance in which the ratio does not meet or surpass the secondary data requirement threshold, outputting, by the one or more processors, a secondary notification to the display or to the database record, the secondary notification warning that the secondary data requirement threshold was not met.

8. The computer-implemented method of claim 1, wherein the internal system comprises a worker performance service.

9. The computer-implemented method of claim 1, wherein the retrieved data comprises location data indicative of a geographic location at which the worker performed a first task of the one or more tasks.

10. The computer-implemented method of claim 1, wherein outputting the validated combined data to the data model comprises inserting a first parameter associated with the validated combined data into a first parameter placeholder of the data model.

11. The computer-implemented method of claim 1, further comprising:

converting, by the one or more processors, second retrieved data by extracting second data from the second retrieved data based on a configuration file associated with the user performance external system.

12. A computer system for converting data from an external system to data to be used by an internal system, the computer system comprising:

a memory having processor-readable instructions stored therein; and one or more processors configured to access the memory and execute the processor-readable instructions, which when executed by the one or more processors configures the one or more processors to perform a plurality of functions, including functions for:

receiving at least one user selection from a list of domains for executing at least one task;

determining one or more data requirements corresponding to the at least one user selection;

in response to determining the one or more data requirements, retrieving data from one or more external systems, wherein at least one of the one or more external systems includes a user performance external system, wherein the user performance external system is configured to capture user performance data indicative of one or more tasks performed by a worker associated with the user performance external system;

converting the retrieved data based on the one or more data requirements, the converting including extracting data from the retrieved data based on the one or more data requirements, wherein the retrieved data comprises the user performance data;

validating the extracted data, the validating comprising:

comparing the extracted data to the one or more data requirements;

based on the comparing, determining that the extracted data comprises an insufficient amount of data to be validated; and in response to determining that the extracted data comprises an insufficient amount of data to be validated, terminating the validation of the extracted data;

retrieving additional data from the one or more external systems in response to the terminating of the validating of the extracted data;

validating combined data, wherein the combined data comprises the extracted data and the additional data;

outputting the validated combined data to a data model for use by an internal system to execute the at least one task;

detecting in real-time, by the one or more processors, an idle worker based at least on task progress data in the combined data, wherein the task progress data comprises visual recognition event data associated with progress of the at least one task; and performing reassignment of a different task to the worker based on task requirements and worker availability.

13. The computer system of claim 12, wherein the list of domains includes at least one of: a task domain, a user domain, a location domain, or an incident domain.

14. The computer system of claim 12, the functions further comprising:

preprocessing the retrieved data, the preprocessing including at least one of: decrypting the retrieved data, error handling the retrieved data, or normalizing the retrieved data.

15. The computer system of claim 12, wherein validating the extracted data includes determining that the extracted data is current by analyzing a time stamp of the extracted data.

16. The computer system of claim 12, wherein the validating the combined data includes:

translating the one or more data requirements into one or more primary data requirements and one or more secondary data requirements;

comparing the combined data to the one or more primary data requirements;

based on the comparing, determining a ratio of the one or more primary data requirements that the combined data meets;

analyzing the ratio to determine whether the ratio meets or surpasses a primary data requirement threshold; and in an instance in which the ratio does not meet or surpass the primary data requirement threshold, outputting a notification to a display or to a database record, the notification indicating that the validating may not be completed.

17. The computer system of claim 16, the functions further comprising:

comparing the combined data to the one or more secondary data requirements;

based on the comparing, determining a ratio of the one or more secondary data requirements that the combined data meets;

analyzing the ratio to determine whether the ratio meets or surpasses a secondary data requirement threshold; and in an instance in which the ratio does not meet or surpass the secondary data requirement threshold, outputting a secondary notification to the display or to the database record, the secondary notification warning that the secondary data requirement threshold was not met.

18. A non-transitory computer-readable medium containing instructions for converting data from an external system to data to be used by an internal system, the instructions comprising:

receiving at least one user selection from a list of domains for executing at least one task;

determining one or more data requirements corresponding to the at least one user selection;

in response to determining the one or more data requirements, retrieving data from one or more external systems, wherein at least one of the one or more external systems includes a user performance external system, wherein the user performance external system is configured to capture user performance data indicative of one or more tasks performed by a worker associated with the user performance external system;

converting the retrieved data based on the one or more data requirements, the converting including extracting data from the retrieved data based on the one or more data requirements, wherein the retrieved data comprises the user performance data;

validating the extracted data, the validating comprising:

comparing the extracted data to the one or more data requirements;

based on the comparing, determining that the extracted data comprises an insufficient amount of data to be validated; and in response to determining that the extracted data comprises an insufficient amount of data to be validated, terminating the validation of the extracted data;

retrieving additional data from the one or more external systems in response to the terminating of the validating of the extracted data;

validating combined data, wherein the combined data comprises the extracted data and the additional data;

outputting the validated combined data to a data model for use by an internal system to execute the at least one task;

detecting in real-time an idle worker based at least on task progress data in the combined data, wherein the task progress data comprises visual recognition event data associated with progress of the at least one task; and performing reassignment of a different task to the worker based on task requirements and worker availability.

19. The non-transitory computer-readable medium of claim 18, wherein the validating the combined data includes:

translating the one or more data requirements into one or more primary data requirements and one or more secondary data requirements;

comparing the combined data to the one or more primary data requirements;

based on the comparing, determining a ratio of the one or more primary data requirements that the combined data meets;

analyzing the ratio to determine whether the ratio meets or surpasses a primary data requirement threshold; and in an instance in which the ratio does not meet or surpass the primary data requirement threshold, outputting a notification to a display or to a database record, the notification indicating that the validating may not be completed.

20. The non-transitory computer-readable medium of claim 19, the instructions further comprising:

comparing the combined data to the one or more secondary data requirements;

based on the comparing, determining a ratio of the one or more secondary data requirements that the combined data meets;

analyzing the ratio to determine whether the ratio meets or surpasses a secondary data requirement threshold; and in an instance in which the ratio does not meet or surpass the secondary data requirement threshold, outputting a secondary notification to the display or to the database record, the secondary notification warning that the secondary data requirement threshold was not met.

* * * * *